(12) United States Patent
Kusumi et al.

(10) Patent No.: US 8,712,619 B2
(45) Date of Patent: Apr. 29, 2014

(54) VEHICLE AND METHOD FOR CONTROLLING VEHICLE

(75) Inventors: Hidetoshi Kusumi, Nagoya (JP); Sumikazu Syamoto, Nagoya (JP); Kazumasa Arai, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 35 days.

(21) Appl. No.: 13/509,908

(22) PCT Filed: Nov. 17, 2009

(86) PCT No.: PCT/JP2009/069470
§ 371 (c)(1),
(2), (4) Date: Jul. 6, 2012

(87) PCT Pub. No.: WO2011/061809
PCT Pub. Date: May 26, 2011

(65) Prior Publication Data
US 2012/0283902 A1    Nov. 8, 2012

(51) Int. Cl.
*B60L 9/00* (2006.01)
*B60L 11/00* (2006.01)
*G05D 1/00* (2006.01)
*G05F 7/00* (2006.01)
*G05D 3/00* (2006.01)
*G06F 17/00* (2006.01)

(52) U.S. Cl.
USPC ............................................ 701/22; 180/2.2

(58) Field of Classification Search
USPC ............. 701/22, 110, 99; 318/53; 180/65.25, 180/2.2, 209; 307/9.1, 104; 340/55; 429/94; 320/132, 103, 149
See application file for complete search history.

(56) References Cited

U.S. PATENT DOCUMENTS 7,587,269 B2 *   9/2009   Kamichi et al. ............... 701/110
(Continued)

FOREIGN PATENT DOCUMENTS

| JP | A-10-262305 | 9/1998 |
| JP | A-2000-287302 | 10/2000 |
| JP | A-2003-23703 | 1/2003 |
| JP | A-2003-199211 | 7/2003 |

(Continued)

OTHER PUBLICATIONS

Dec. 28, 2009 International Search Report issued in International Patent Application No. PCT/JP2009/069470.

*Primary Examiner* — Thomas Black
*Assistant Examiner* — Robert Payne
(74) *Attorney, Agent, or Firm* — Oliff PLC

(57) ABSTRACT

A vehicle is equipped with a battery configured so as to be rechargeable, a motor generator configured so as to generate the driving force of the vehicle by use of electric power stored in the battery, a switch configured so as to switch between generation of a command for extending the use period of the battery and stop of generation of the command, and an ECU for controlling the state of charge of the battery. The ECU sets the control range of SOC of the battery. When the switch stops generation of the command, the ECU sets the control range to a first range. Meanwhile, when a command is generated by the switch, the ECU sets the control range to a second range narrower than the first range.

14 Claims, 25 Drawing Sheets

(56) References Cited

U.S. PATENT DOCUMENTS

| | | | |
|---|---|---|---|
| 7,847,495 B2 * | 12/2010 | Oyobe et al. | 318/53 |
| 8,229,614 B2 * | 7/2012 | Kaita et al. | 701/22 |
| 8,290,652 B2 * | 10/2012 | Niimi | 701/22 |
| 8,423,217 B2 * | 4/2013 | Kojima et al. | 701/22 |
| 8,428,804 B2 * | 4/2013 | Sakai et al. | 701/22 |
| 2009/0058326 A1 | 3/2009 | Oyobe et al. | |

FOREIGN PATENT DOCUMENTS

| | | |
|---|---|---|
| JP | A-2003-297435 | 10/2003 |
| JP | A-2004-56867 | 2/2004 |
| JP | A-2005-65352 | 3/2005 |
| JP | A-2005-227141 | 8/2005 |
| JP | A-2007-62639 | 3/2007 |
| JP | A-2008-263730 | 10/2008 |

* cited by examiner

FIG.17

| TIME OF USE | UPPER LIMIT | LOWER LIMIT |
|---|---|---|
| 1 | Ua | La |
| 2 | Ub | Lb |
| 3 | Uc | Lc |
| ⋮ | ⋮ | ⋮ |

VEHICLE AND METHOD FOR CONTROLLING VEHICLE

TECHNICAL FIELD

The present invention relates to a vehicle and a method of controlling the vehicle and, more specifically, to charge-control of a power storage device mounted on a vehicle.

BACKGROUND ART

Vehicles including hybrid vehicles, electric vehicles and fuel-cell vehicles include a power storage device for storing electric power and an electric motor. As the electric power is supplied from the power storage device to the electric motor, the electric motor generates driving force for driving the vehicle. At the time of braking, the electric motor regenerates power. The regenerated electric power is supplied to the power storage device. Therefore, while the vehicle is running, charging and discharging of the power storage device are controlled such that an index value (SOC) indicating the state of charge of the power storage device is within an appropriate range. SOC is defined as a ratio of the current amount of charges with respect to the amount of charges in a fully charged state. SOC of the power storage device in the fully charged state is 100(%) and SOC of the power storage device not charged at all is 0(%).

By way of example, Japanese Patent Laying-Open No. 2004-56867 (PTL 1) discloses a hybrid vehicle control system in which control width of SOC of the power storage device is adjustable in accordance with traveling sections. The control system includes a road information acquiring unit acquiring road information of a scheduled travel route of the vehicle, a control width and traveling method determining unit for changing control width of SOC of power storage means and for determining the method of traveling of the vehicle, and a control processing unit for controlling traveling of the vehicle in accordance with the determined method of travel. The control width and traveling method determining unit calculates SOC of the power storage means (battery) in a prescribed section of the scheduled travel route of the vehicle, and based on the SOC, changes the control width of SOC. Further, the control width and traveling method determining unit determines the method of traveling of the hybrid vehicle such that SOC at the end of prescribed section is within the control width.

By way of example, Japanese Patent Laying-Open No. 2005-65352 (PTL 2) discloses a controller for controlling charging/discharging of a battery. The controller changes control width of battery SOC to prevent over-discharge of the battery, and avoids the influence of memory effect on charging/discharging of the battery. More specifically, the controller increases both the upper and lower limits of control width of the SOC, if memory effect occurs.

CITATION LIST

Patent Literature

PTL 1: Japanese Patent Laying-Open No. 2004-56867
PTL 2: Japanese Patent Laying-Open No. 2005-65352

SUMMARY OF INVENTION

Technical Problem

The cruising distance of vehicles described above should preferably be as long as possible. In the present specification, the "cruising distance" refers to a distance a vehicle can travel by the electric power stored in the power storage device.

One solution to make longer the cruising distance is to increase the number of power storage devices or to increase the number of cells forming the power storage device. If the number of power storage devices or the number of cells increases, however, the volume and weight of the power storage device or devices naturally increase and, in addition, the cost for the power storage device or devices increases. As the weight of power storage device increases, the actual cruising distance could be shorter than the distance calculated based on the capacity of the power storage device.

The controller disclosed in PTL 1 changes the control width of SOC while the hybrid vehicle is traveling, in order to recover sufficient regenerative current to the battery. This can reduce fuel consumption of the hybrid vehicle. PTL 1 discloses, however, only the technique for reducing fuel consumption for a vehicle traveling in a given period of time.

While a hybrid vehicle travels repeatedly, the power storage device deteriorates gradually. When the power storage device deteriorates, capacity of the power storage device decreases. Therefore, as the hybrid vehicle is used for longer years, it possibly becomes more difficult to sufficiently attain the effect of reducing fuel consumption. PTL 1 does not describe any specific method of preventing decrease in capacity of the power storage device.

PTL 2 describes a method of preventing decrease in battery capacity caused by the memory effect. PTL 2, however, is silent about battery deterioration caused when the vehicle travels repeatedly. In other words, PTL 2 does not disclose battery control considering battery deterioration.

An object of the present invention is to provide a vehicle that can reduce deterioration of power storage device and ensure sufficient cruising distance, as well as to provide a method of controlling the vehicle.

Solution to Problem

According to an aspect, the present invention provides a vehicle, including: a power storage device configured to be rechargeable; an electric motor configured to generate driving force for driving the vehicle by using electric power stored in the storage device; a command generating unit configured to switch between generation of a command to extend a useable period of the power storage device and stopping of generation of the command, by a manual operation; and a controller for controlling state of charge of the power storage device. The controller includes a state estimating unit configured to calculate an index value indicating the state of charge, and a setting unit configured to set a control range of the index value. The setting unit sets the control range to a first range while the command generating unit stops generation of the command, and sets the control range to a second range narrower than the first range, when the command is generated by the command generating unit.

Preferably, the vehicle further includes a charging mechanism configured to supply electric power output from a power source outside the vehicle to the power storage device. The control range is a range of the index value at a time of charging of the power storage device. The first range has a first upper limit value. The second range has a second upper limit value. The setting unit is configured to set the second upper limit value such that the second upper limit value becomes smaller than the first upper limit value.

Preferably, the controller further includes a distance calculating unit. The distance calculating unit is configured to estimate a possible distance of travel by the vehicle based on the control range and degree of deterioration of the power storage device. The possible distance of travel includes a first possible distance of travel, and a second possible distance of travel. The first possible distance of travel represents a distance the vehicle can travel if a range of variation of the index value during traveling of the vehicle is within the first range. The second possible distance of travel represents a distance the vehicle can travel if the range of variation of the index value during traveling of the vehicle is within the second range. The vehicle further includes a display device. The display device is configured to be able to display the first and second possible distances of travel calculated by the distance calculating unit.

Preferably, the first and second possible distances of travel represent distances the vehicle can travel at present. The controller further includes a deterioration state estimating unit configured to estimate present degree of deterioration of the power storage device as the degree of deterioration. The distance calculating unit is configured to estimate the first and second possible distances of travel based on the degree of deterioration estimated by the deterioration state estimating unit.

Preferably, the first and second possible distances of travel represent distances the vehicle can travel after a prescribed time period from present time. The controller further includes a deterioration state estimating unit configured to estimate degree of deterioration of the power storage device after the prescribed time period from present time. The distance calculating unit is configured to estimate the first and second possible distances of travel based on the degree of deterioration estimated by the deterioration state estimating unit.

Preferably, the controller further includes a storage unit configured to store history of range of variation of the index value while the vehicle is traveling. The setting unit is configured to change the second upper limit value based on the history.

Preferably, the vehicle further includes a navigation device for setting a route of travel of the vehicle. The setting unit is configured to set the second upper limit value such that the vehicle can travel the entire route of travel set by the navigation device.

Preferably, the controller further includes a notifying unit. The notifying unit is configured to notify the user that, when the second upper limit value set by the setting unit exceeds a standard value, the manual operation of the command generating unit for stopping generation of the command is necessary.

According to another aspect, the present invention provides a method of controlling a vehicle. The vehicle includes a power storage device configured to be rechargeable, an electric motor configured to generate driving force for driving the vehicle by using electric power stored in the storage device, a command generating unit configured to switch between generation of a command to extend a useable period of the power storage device and stopping of generation of the command, by a manual operation, and a controller for controlling state of charge of the power storage device.

The control method includes the steps of calculating an index value indicating the state of charge, and setting a control range of the index value. At the step of setting, the control range is set to a first range if the command generating unit stops generation of the command, and the control range is set to a second range narrower than the first range if the command is generated by the command generating unit.

Preferably, the vehicle further includes a charging mechanism configured to supply electric power output from a power source outside the vehicle to the power storage device. The control range is a range of the index value at a time of charging of the power storage device. The first range has a first upper limit value. The second range has a second upper limit value. At the setting step, the second upper limit value is set such that the second upper limit value becomes smaller than the first upper limit value.

Preferably, the vehicle further includes a display device. The control method further includes the step of estimating a possible distance of travel by the vehicle based on the control range and degree of deterioration of the power storage device. The possible distance of travel includes a first possible distance of travel, and a second possible distance of travel. The first possible distance of travel represents a distance the vehicle can travel if a range of variation of the index value during traveling of the vehicle is within the first range. The second possible distance of travel represents a distance the vehicle can travel if the range of variation of the index value during traveling of the vehicle is within the second range.

The control method farther includes the step of outputting the first and second possible distances of travel to the display device so that the first and second possible distances of travel can be displayed on the display device.

Preferably, the first and second possible distances of travel represent distances the vehicle can travel at present. The step of estimating the possible distance of travel includes the steps of estimating present degree of deterioration of the power storage device, and estimating the first and second possible distances of travel by using the degree of deterioration.

Preferably, the first and second possible distances of travel represent distances the vehicle can travel after a prescribed time period from present time. The step of estimating the possible distance of travel includes the steps of estimating the degree of deterioration after the prescribed time period from the present time, and estimating the first and second possible distances of travel using the degree of deterioration.

Preferably, the setting step includes the steps of learning history of range of variation of the index value while the vehicle is traveling, and changing the second upper limit value based on the history.

Preferably, the vehicle further includes a navigation device for setting a route of travel of the vehicle. At the step of setting, the second upper limit value is set such that the vehicle can travel the entire route of travel set by the navigation device.

Preferably, the control method further includes the step of notifying a user that, when the second upper limit value set at the setting step exceeds a standard value, the manual operation of the command generating unit for stopping generation of the command is necessary, Advantageous Effects of Invention By the present invention, deterioration of a power storage device mounted on the vehicle can be reduced, and sufficient cruising distance of the vehicle can be ensured.

BRIEF DESCRIPTION OF DRAWINGS

FIG. 17 shows use history of the battery stored in the history storage unit shown in FIG. 16.

DESCRIPTION OF EMBODIMENTS

Figure 1:
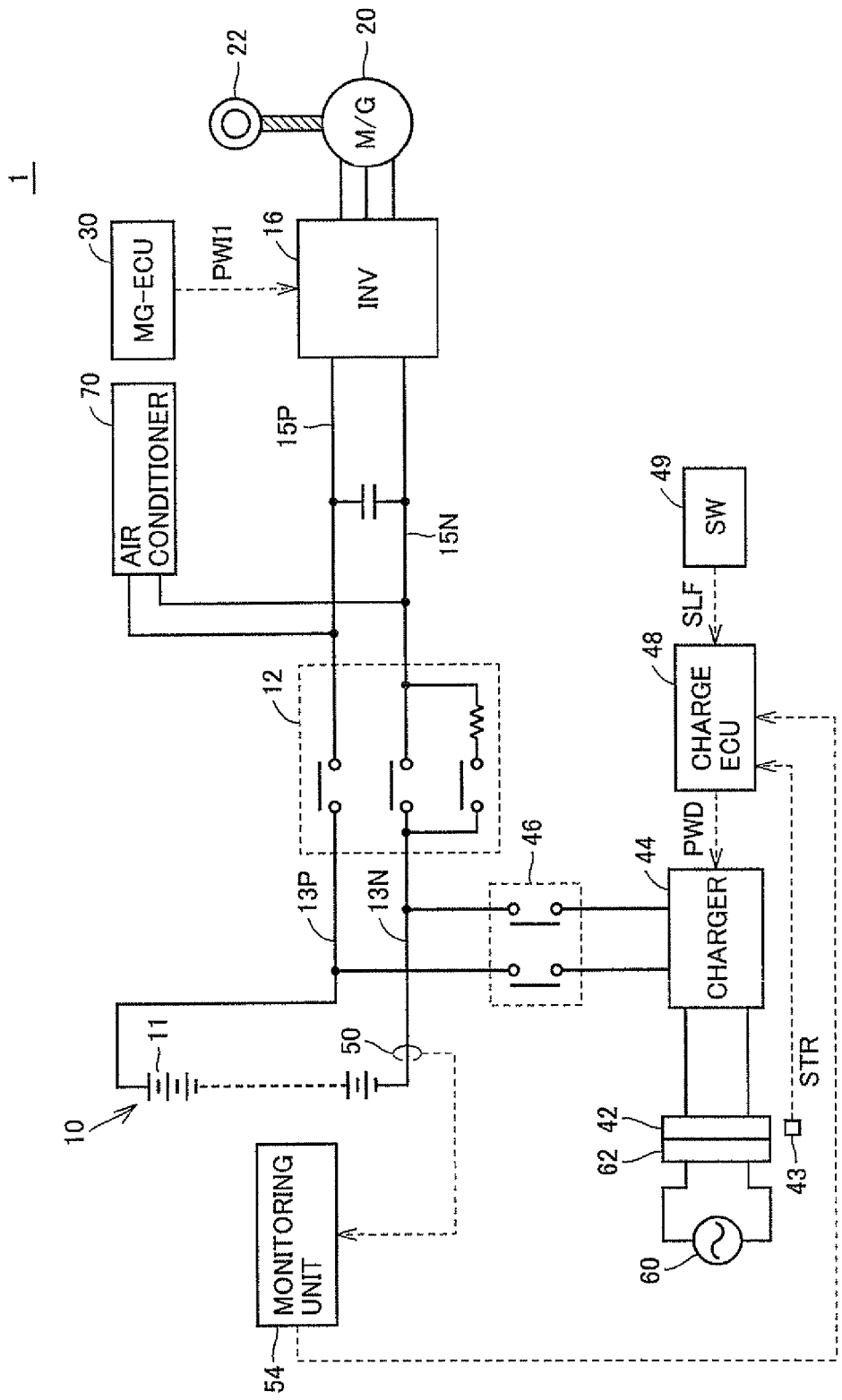
FIG. 1 is an overall block diagram of a vehicle in accordance with Embodiment 1 of the present invention.

In the following, embodiments of the present invention will be described in detail with reference to the figures. In the figures, the same or corresponding portions are denoted by the same reference characters, and description thereof will not be repeated.

Embodiment 1

FIG. 1 is an overall block diagram of the vehicle in accordance with Embodiment 1 of the present invention. Referring to FIG. 1, vehicle 1 in accordance with Embodiment 1 of the present invention includes a battery 10, a system main relay (hereinafter also referred to as "SMR") 12, an inverter 16, a motor generator (hereinafter also referred to as "MG") 20, driving wheels 22, and an MG-ECU (Electronic Control Unit) 30. Vehicle 1 further includes a charge inlet 42, a sensor 43, a charger 44, a relay 46, a charge ECU 48, a switch 49, a current sensor 50, a monitoring unit 54 and an air conditioner 70.

Battery 10 is a power storage device configured to be rechargeable. Battery 10 consists of a battery assembly including a plurality of cells 11 connected in series. In the present embodiment, battery 10 is a lithium ion battery.

When vehicle 1 travels, battery 10 supplies electric power for driving MG 20 to inverter 16. As the electric power stored in battery 10 is supplied to MG 20, MG 20 generates driving force for driving vehicle 1. At the time of braking of vehicle 1, electric power regenerated by MG 20 is supplied to battery 10. When electric power is supplied to vehicle 1 from a power source 60 provided outside of vehicle 1, charger 44 supplies the electric power to battery 10. With the supplied electric power, battery 10 is charged. Power source 60 is, for example, an AC power source.

SMR 12 is provided between battery 10 and inverter 16. SMR 12 is connected to battery 10 by a positive electrode line 13P and a negative electrode line 13N. SMR 12 is connected to inverter 16 by a positive electrode line 15P and a negative electrode line 15N. When vehicle 1 is running, SMR 12 is on. On the other hand, when battery 10 is charged by charger 44, SMR 12 is off. SMR 12 may be provided between battery 10 and relay 46.

Inverter 16 drives MG 20 based on a control signal PWI1 from MG-ECU 30. Though not shown, inverter 16 is formed, for example, by a three-phase bridge circuit including U-phase, V-phase and W-phase arms. Inverter 16 converts DC power output from battery 10 to AC power, and supplies the AC power to MG 20. Inverter 16 coverts AC power generated by MG 20 to DC power and supplies the DC power to battery 10. For conversion between the DC power for the battery and the DC power for the inverter, a voltage converter (DC/DC converter) may be provided between battery 10 and inverter 16.

MG 20 is an AC rotating electrical machine, implemented, for example, by a three-phase AC synchronous electric motor having a rotor with a permanent magnet embedded. A rotation shaft of MG 20 is coupled to driving wheels 22. MG-ECU 30 generates control signal PWI1 for driving MG 20, and outputs the control signal PWI1 to inverter 16.

Connector 62 is provided outside of vehicle 1, and connected to power source 60. Charge inlet 42 is connected to the input side of charger 44 and is configured to be connectable to connector 62. When charge inlet 42 is connected to connector 62, the AC power from power source 60 is input to charge inlet 42. Sensor 43 detects connection between charge inlet 42 and connector 62, and outputs a signal STR indicating that charging of battery 10 can be started. When connector 62 is disconnected from charge inlet 42, sensor 43 stops output of the signal STR.

Charger 44 is connected by means of relay 46 to positive electrode line 13P and negative electrode line 13N, and supplies the electric power output from power source 60 to battery 10. Charger 44 is formed, for example, by an AC/DC converter converting AC power to DC power. Charger 44 converts AC power supplied from power source 60 to DC power based on a control signal PWD from charge ECU 48. The DC power output from charger 44 is supplied through relay 46, positive electrode line 13P and negative electrode line 13N to battery 10. While charger 44 is charging battery 10, relay 46 is kept on.

Charger 44 may be provided outside of vehicle 1. In that case, charge inlet 42 receives the DC power output from charger 44. The electric power input to charge inlet 42 is supplied through relay 46, positive electrode line 13P and negative electrode line 13N to battery 10. In short, charge inlet 42 and relay 46 supply electric power output from power source 60 to battery 10.

Charge ECU 48 starts control of charger 44 based on the signal STR from sensor 43. More specifically, charge ECU 48 generates a control signal PWD for driving charger 44 based on detected values of current, voltage and temperature transmitted from monitoring unit 54, and transmits the control signal PWD to charger 44. Based on the control signal PWD, charger 44 converts the AC power supplied from power source 60 to DC power.

Charge ECU 48 controls charger 44 based on an index value (SOC) indicating the state of charge of battery 10. When SOC of battery 10 reaches the upper limit value of a control range, charge ECU 48 stops output of control signal PWD. As the charge ECU 48 stops output of control signal PWD, charger 44 stops. As charger 44 stops, charging of battery 10 ends. SOC is defined as the ratio of the current amount of charges in battery 10 to the amount of charges in battery 10 in the fully charged state.

Switch 49 is mounted on vehicle 1 as a switch operated by a user. By manual operation, switch 49 can be switched to on-state and off-state. When switch 49 is on, switch 49 generates a command (signal SLF) for setting a charging mode of battery 10 to reduce deterioration of battery 10. As the deterioration of battery 10 is reduced, the period of use of battery 10 can be made longer. More specifically, the signal SLF is a command to make longer the period of use of battery 10. In the following, the charging mode for reducing deterioration of battery 10 will be referred to as "long life mode."

When the user turns off switch 49, switch 49 stops generation of signal SLF. Thus, setting of the long life mode is cancelled, and the charging mode of vehicle 1 is switched from the long life mode to a normal mode. Specifically, by operating switch 49, the user can select the charging mode of vehicle 1 from the long life mode and the normal mode.

Charge ECU 48 sets the control range of SOC for charging battery 10. The control range in the long life mode is narrower than the control range in the normal mode. Specifically, the upper limit value of control range in the long life mode is smaller than the upper limit value of control range in the normal mode. The lower limit value of control range in the long life mode is equal to or higher than the lower limit value of control range in the normal mode.

In the following, the "upper limit of control range" is also referred to as "upper limit value of SOC" or simply "upper limit value."

Current sensor 50 detects a current input to battery 10 and a current output from battery 10, and outputs an analog signal that changes in accordance with the magnitude of current to monitoring unit 54.

Monitoring unit 54 converts the analog signal output from current sensor 50 to a digital signal indicating a current value. Monitoring unit 54 outputs the digital signal (current value) to charge ECU 48. Further, monitoring unit 54 detects temperature and voltage of each battery block consisting of a prescribed number of cells 11.

Monitoring unit 54 outputs digital signals representing the temperature and voltage of each block to charge ECU 48.

Auxiliary machinery that operates with the electric power supplied from battery 10 is connected to positive electrode line 13P and negative electrode line 13N. FIG. 1 shows air conditioner 70 as a representative example of auxiliary machinery.

Figure 2:
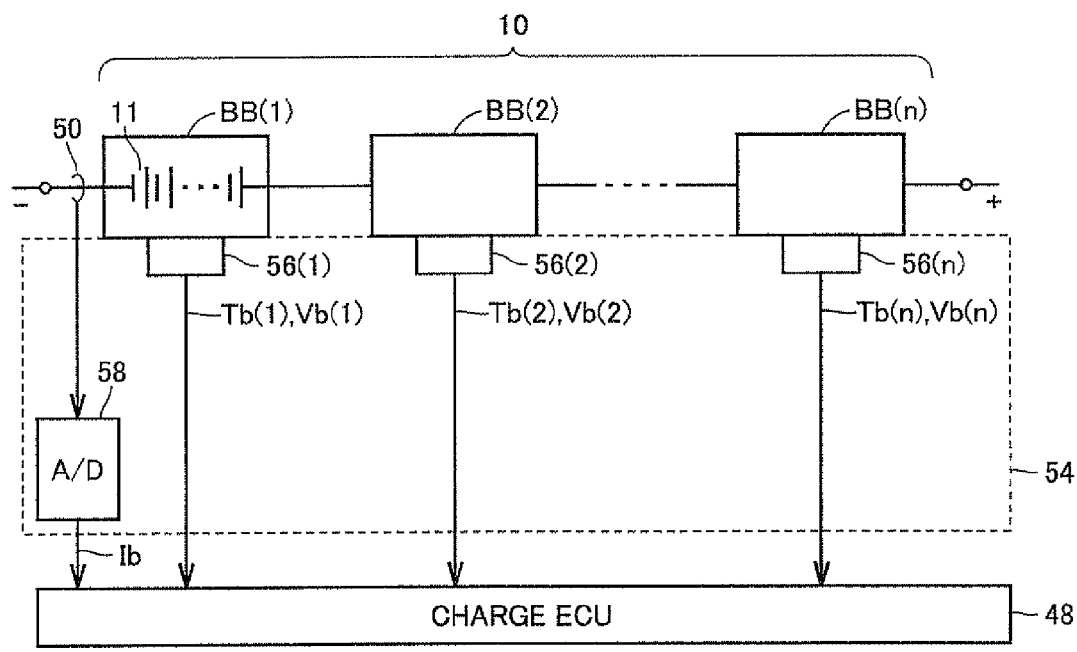
FIG. 2 shows an example of a configuration of a monitoring unit shown in FIG. 1.

FIG. 2 shows an example of a configuration of a monitoring unit shown in FIG. 1. Referring to FIG. 2, battery 10 includes a plurality of series-connected cells 11. The plurality of cells 11 is divided into a plurality of battery blocks BB(1) to BB(n) (n: natural number). Monitoring unit 54 includes a group of sensors 56(1) to 56(n) arranged corresponding to battery blocks BB(1) to BB(n), respectively, and an analog-digital converter (A/D) 58 arranged corresponding to current sensor 50.

Each of the sensors 56(1) to 56(n) detects the temperature and voltage of the corresponding block. Sensors 56(1) to 56(n) detect temperatures Tb(1) to Tb(n), respectively. Further, sensors 56(1) to 56(n) detect voltages Vb(1) to Vb(n), respectively. Detected values of sensors 56(1) to 56(n) are output to charge ECU 48.

Analog-digital converter 58 converts an analog signal from current sensor 50 to a digital signal. The digital signal indicates the value of current Ib. The current Ib represents the current input to battery 10 and the current output from battery 10.

In addition to the group of sensors 56(1) to 56(n) and analog-digital converter (A/D) 58 shown in FIG. 2, a monitor for monitoring voltage of cell 11 may be provided for each cell 11. Each monitor turns on a flag indicating abnormality of the cell, if the voltage of corresponding cell is out of a normal range. If any flag is turned on, charge ECU 48 can detect abnormality of battery 10.

Figure 3:
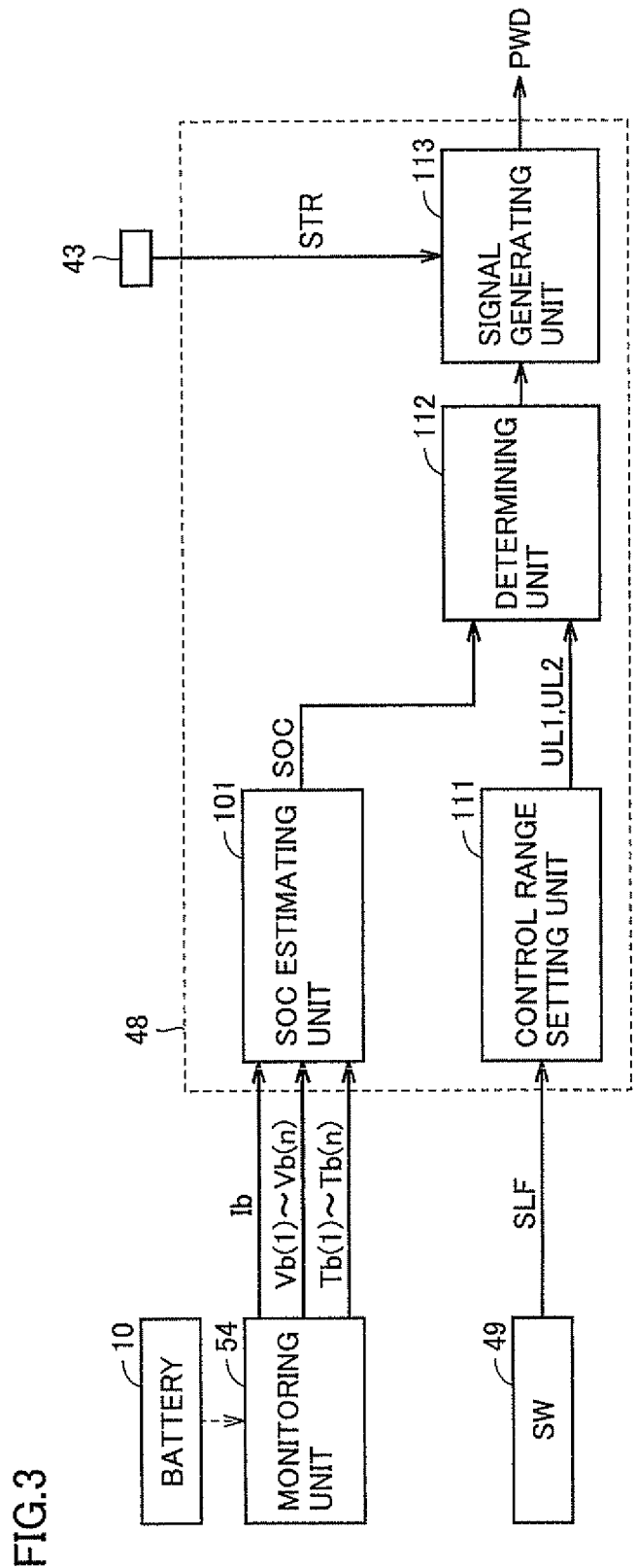
FIG. 3 is a functional block diagram of a charge ECU shown in FIG. 1.

FIG. 3 is a functional block diagram of a charge ECU shown in FIG. 1. Referring to FIG. 3, charge ECU 48 includes an SOC estimating unit 101, a control range setting unit 111, a determining unit 112 and a signal generating unit 113.

SOC estimating unit 101 receives detected values of current Ib, voltages Vb(1) to Vb(n) and temperatures Tb(1) to Tb(n), from monitoring unit 54. Based on each of the detected values, SOC estimating unit 101 calculates SOC of battery 10 as a whole. More specifically, SOC estimating unit 101 calculates, based on the detected values of each block, the SOC of the corresponding block, and based on the SOC of each block, calculates the overall SOC. In the present embodiment, a known method of calculating SOC of a lithium ion battery can be used for calculating SOC of each block. By way of example, SOC of each block may be calculated based on accumulated value of current Ib. Alternatively, SOC of each block may be calculated at a constant interval, based on correlation between open-circuit voltage (OCV) and SOC and on the voltage value detected by monitoring unit 54. The method of calculating the overall SOC from the SOC of each block is not specifically limited. For instance, the overall SOC may be an average value of SOC of the blocks.

Control range setting unit 111 sets the control range of SOC. If the switch 49 is off, switch 49 stops generation of signal SLF. Here, control range setting unit 111 sets the SOC control range to a first range, and outputs an upper limit value UL1 for the first range. On the other hand, if the user turns on switch 49, switch 49 generates signal SLF. Here, control range setting unit 111 sets the SOC control range to a second range and outputs an upper limit value UL2 for the second range. The first range represents the control range of SOC in the normal mode. The second range represents the control range of SOC in the long life mode.

Determining unit 112 receives SOC from SOC estimating unit 101, and receives either the upper limit value UL1 or UL2 from control range setting unit 111. Determining unit 112 determines whether or not SOC reached the upper limit value (UL1 or UL2). Determining unit 112 outputs the result of determination to signal generating unit 113.

Signal generating unit 113 generates control signal PWD based on the signal STR from sensor 43. Signal generating unit 113 outputs the control signal PWD to charger 44. If it is determined by determining unit 112 that SOC has reached the upper limit value, signal generating unit 113 stops generation of control signal PWD based on the result of determination by determining unit 112. As the generation of control signal PWD stops, charger 44 stops. As charger 44 stops, charging of battery 10 ends.

Figure 4:
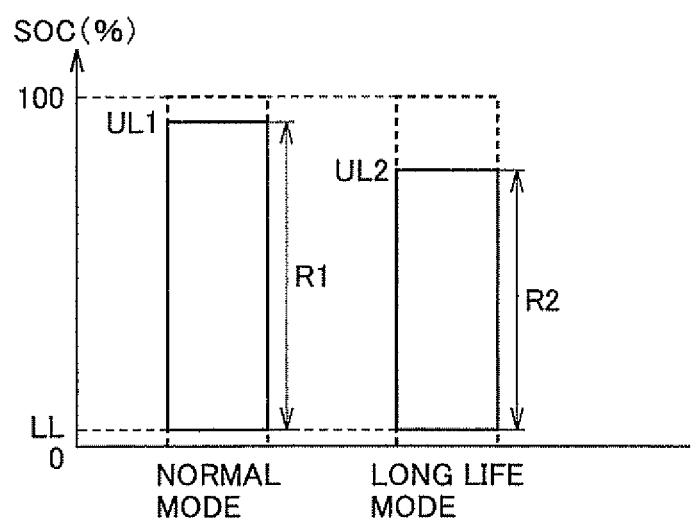
FIG. 4 is an illustration showing SOC control ranges in the normal mode and in the long life mode.

FIG. 4 is an illustration showing SOC control ranges in the normal mode and in the long life mode. Referring to FIG. 4, the first range R1 is the control range of SOC in the normal mode. The second range R2 is the control range of SOC in the long mode. UL1 represents the upper limit value of first range R1, and UL2 represents the upper limit value of second range R2.

The lower limit value of first range R1 and the lower limit value of second range R2 are both LL. It is noted, however, that the lower limit value of second range R2 may be higher than the lower limit value of first range R1. Upper limit value UL2 is smaller than upper limit value UL1. Therefore, the second range R2 is narrower than the first range R1. In order to prevent overcharge of battery 10, upper values UL1 and UL2 are both smaller than 100(%). In order to prevent over-discharge of battery 10, the lower limit value LL is larger than 0(%).

Figure 5:
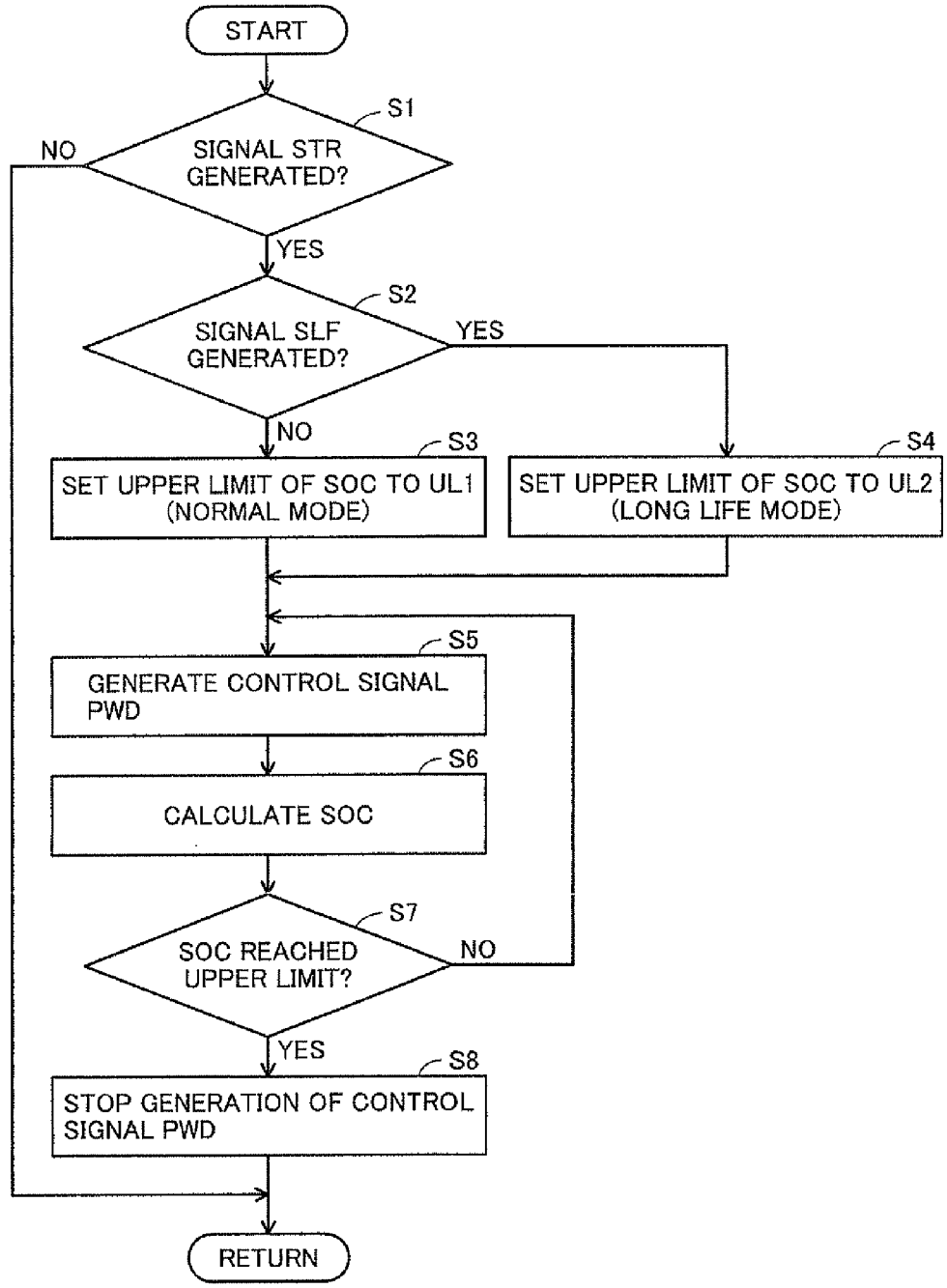
FIG. 5 is a flowchart representing control of battery charging executed by the charge ECU shown in FIG. 1.

FIG. 5 is a flowchart representing control of battery charging executed by the charge ECU shown in FIG. 1. The process of the flowchart is executed at every prescribed interval, or every time prescribed conditions are satisfied.

Referring to FIG. 5, at step S1, charge ECU 48 determines whether or not the signal STR is generated. If signal generating unit 113 receives the signal STR, signal generating unit 113 determines that the signal STR is generated. In this case (YES at step S1), the process proceeds to step S2. On the other hand, if signal generating unit 113 does not receive the signal STR, signal generating unit 113 determines that the signal STR is not generated. Then (NO at step S1), the process returns to the main routine.

At step S2, charge ECU 48 determines whether or not the signal SLF is generated. If control range setting unit 111 does not receive the signal SLF, control range setting unit 111 determines that the signal SLF is not generated. Then (NO at step S2), the process proceeds to step S3. On the other hand, if control range setting unit 111 receives the signal SLF, control range setting unit 111 determines that the signal SLF is generated. Then (YES at step S2), the process proceeds to step S4.

At step S3, charge ECU 48 (control range setting unit 111) sets the upper limit value of SOC control range to UL1. Thus, the charging mode is set to the normal mode. At step S4, charge ECU 48 (control range setting unit 111) sets the upper limit value of SOC control range to UL2. Thus, the charging mode is set to the long life mode. The upper limit value (UL1 or UL2) set by control range setting unit 111 is transmitted from control range setting unit 111 to determining unit 112.

After the process of step S3 or S4, the process of step S5 is executed. At step S5, charge ECU 48 (signal generating unit 113) generates the control signal PWD. Based on the control signal PWD, charger 44 converts the AC power supplied from power source 60 to DC power. As the DC power is supplied from charger 44 to battery 10, battery 10 is charged.

At step S6, charge ECU 48 calculates SOC of battery 10. More specifically, SOC estimating unit 101 calculates the overall SOC of battery 10 based on the current value Ib, voltage values Vb(1) to Vb(n) and temperatures Tb(1) to Tb(n) transmitted from monitoring unit 54.

At step S7, charge ECU 48 determines whether or not SOC has reached the upper limit value (UL1 or UL2). More specifically, at step S7, determining unit 112 compares the SOC calculated by SOC estimating unit 101 with the upper limit. Based on the result of comparison, determining unit 112 determines whether or not SOC has reached the upper limit value.

If it is determined that SOC has reached the upper limit value (YES at step S7), the process proceeds to step S8. On the other hand, if it is determined that SOC has not yet reached the upper limit value (NO at step S7), the process returns to step S5. Until SOC reaches the upper limit value, the process of steps S5 to S7 is executed repeatedly to charge battery 10.

At step S8, charge ECU 48 stops generation of the control signal PWD. More specifically, if it is determined by determining unit 112 that SOC has reached the upper limit value, signal generating unit 113 stops generation of control signal PWD based on the result of determination by determining unit 112. As a result, charging of battery 10 ends. If the process of step S8 ends, the overall process is returned to the main routine.

Vehicle 1 shown in FIG. 1 travels using the electric power stored in battery 10. In order to make longer the cruising distance of vehicle 1, it is necessary to take out as much power as possible from battery 10. If the capacity of battery 10 is increased, the amount of electric power taken out from battery 10 can be increased. Increase in battery capacity, however, possibly leads to increased weight and volume of battery 10.

In the present embodiment, the upper limit of SOC at the time of charging battery 10 is set as high as possible. More specifically, the upper limit value is determined in advance such that battery 10 is not overcharged when SOC reaches the upper limit value. On the other hand, the lower limit value (LL) of SOC is determined in advance as a value for preventing over-discharge of battery 10. Thus, it becomes possible to take out much electric power from battery 10. Thus, the cruising distance of vehicle 1 can be made longer.

Further, in the present embodiment, lithium ion battery is used as battery 10. Lithium ion battery is characterized by high energy density. As lithium ion battery is mounted on vehicle 1, it becomes possible to take out much electric power from battery 10, and the size and weight of battery 10 can be reduced.

If the lithium ion battery is kept at high SOC state (for example, fully charged state) for a long time, however, the characteristics of lithium ion battery deteriorate. For example, the capacity of lithium ion battery decreases. By keeping lithium ion battery in low SOC state, deterioration of characteristics of lithium ion battery can be reduced.

Figure 6:
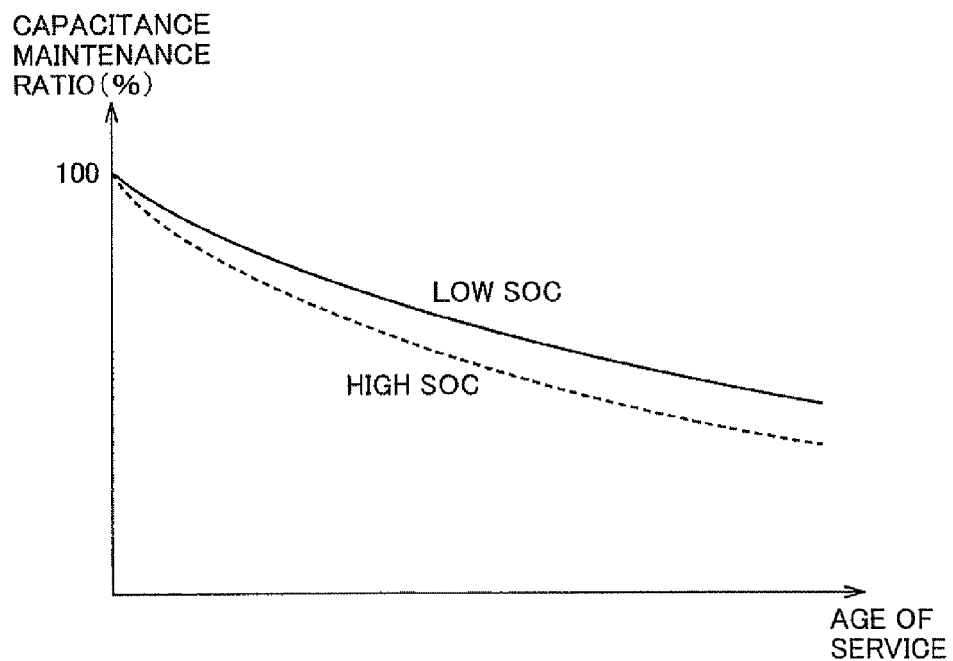
FIG. 6 is a graph showing correlation between age of service of a vehicle running with electric power stored in a lithium ion battery and capacity maintenance ratio of the lithium ion battery.

FIG. 6 is a graph showing correlation between age of service of a vehicle running with electric power stored in a lithium ion battery and capacity maintenance ratio of the lithium ion battery. Referring to FIG. 6, the capacity maintenance ratio when a lithium ion battery is brand-new is defined to be 100(%). As the vehicle travels repeatedly, the lithium ion battery deteriorates gradually. As the age of service of the vehicle becomes longer, the capacity maintenance ratio decreases. Namely, the capacity of lithium ion battery lowers. As the SOC at the end of charging of lithium ion battery is higher, the degree of decrease of capacity maintenance ratio to the age of service increases.

The period from the end of charging until start of traveling of vehicle 1 may differ user by user. Therefore, it is possible that battery 10 is kept at the high SOC state for a long time. If battery 10 is kept at high SOC state for a long time, the capacity of battery 10 may possibly decrease.

In the present embodiment, vehicle 1 has the long life mode for making longer the duration of battery 10. When the long life mode is set, SOC control range becomes narrower. More specifically, the upper limit value of control range is made lower. Since the control range of SOC becomes narrower, SOC at the completion of charging of battery 10 can be made lower. Thus, decrease in capacity of battery 10 can be reduced.

As the decrease in capacity of battery 10 is reduced, decrease in cruising distance of vehicle 1 can also be reduced. As a result, sufficient cruising distance of vehicle 1 can be ensured. By way of example, after a target age of service is reached, the vehicle can travel the target distance.

Figure 7:
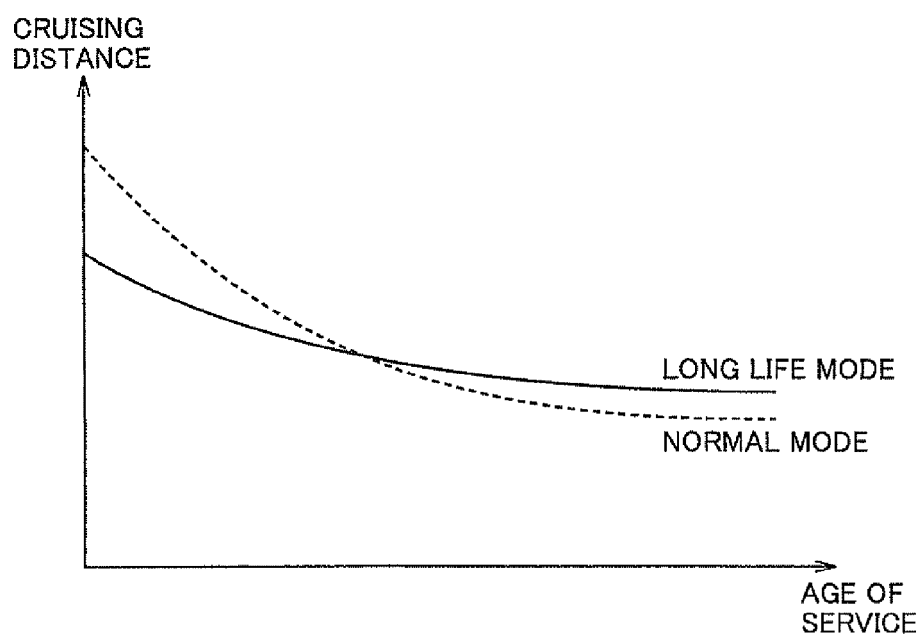
FIG. 7 is a graph showing cruising distances in the long life mode and the normal mode.

FIG. 7 is a graph showing cruising distances in the long life mode and the normal mode. Referring to FIG. 7, if the degree of deterioration of battery 10 is small, battery 10 can store much electric power. Therefore, while the age of service of vehicle 1 is short, the cruising distance in the normal mode is longer than that in the long life mode.

If battery 10 is charged to nearly full, however, deterioration of battery 10 intensifies. Particularly, if battery 10 is new and SOC of battery 10 is high, deterioration of battery 10 proceeds rapidly. If battery 10 is charged in the normal mode, the capacity of battery 10 decreases in a large degree.

On the other hand, if battery 10 is charged in the long life mode, it can slow down deterioration of battery 10. Thus, by charging battery 10 in the long life mode, decrease in capacity of battery 10 can be reduced. As shown in FIG. 7, if the age of service of vehicle 1 becomes longer, the cruising distance in the long life mode can be made longer than that in the normal mode. Specifically, by charging battery 10 in the long life mode, deterioration of battery 10 can be reduced and longer cruising distance of vehicle 1 can be ensured.

Further, according to the present embodiment, vehicle 1 has switch 49 that is operated by the user. By operating switch 49, the user can select the charging mode of battery 10 from the normal mode and the long life mode. If the long life mode is selected, deterioration of battery 10 can be reduced and, hence, even after the age of service becomes longer, sufficient cruising distance can be ensured. On the other hand, if battery 10 has sufficient margin in its performance (when the age of service is short) and the normal mode is selected, the amount of charges of battery 10 can be increased and, therefore, higher traveling performance of vehicle 1 can be attained. For example, vehicle can travel longer distance than normal cruising distance.

According to the present embodiment, since the user can select the charging mode from the normal mode and the long life mode, convenience for the user can be improved.

The control range of SOC during traveling is set independently from the control range at the time of charging battery 10. By way of example, at the time of braking of vehicle 1, SOC increases as battery 10 is charged by regenerative power from MG 20. As a result, SOC possibly becomes higher than the upper limit value at the time of charging of battery 10. SOC, however, lowers again as vehicle 1 continuously travels. Specifically, while vehicle 1 is traveling, it is not likely that battery 10 is kept at the high SOC state for a long time. Therefore, the control range of SOC during traveling can be set independent from the control ranges in the long life mode and in the normal mode.

Embodiment 2

Figure 8:
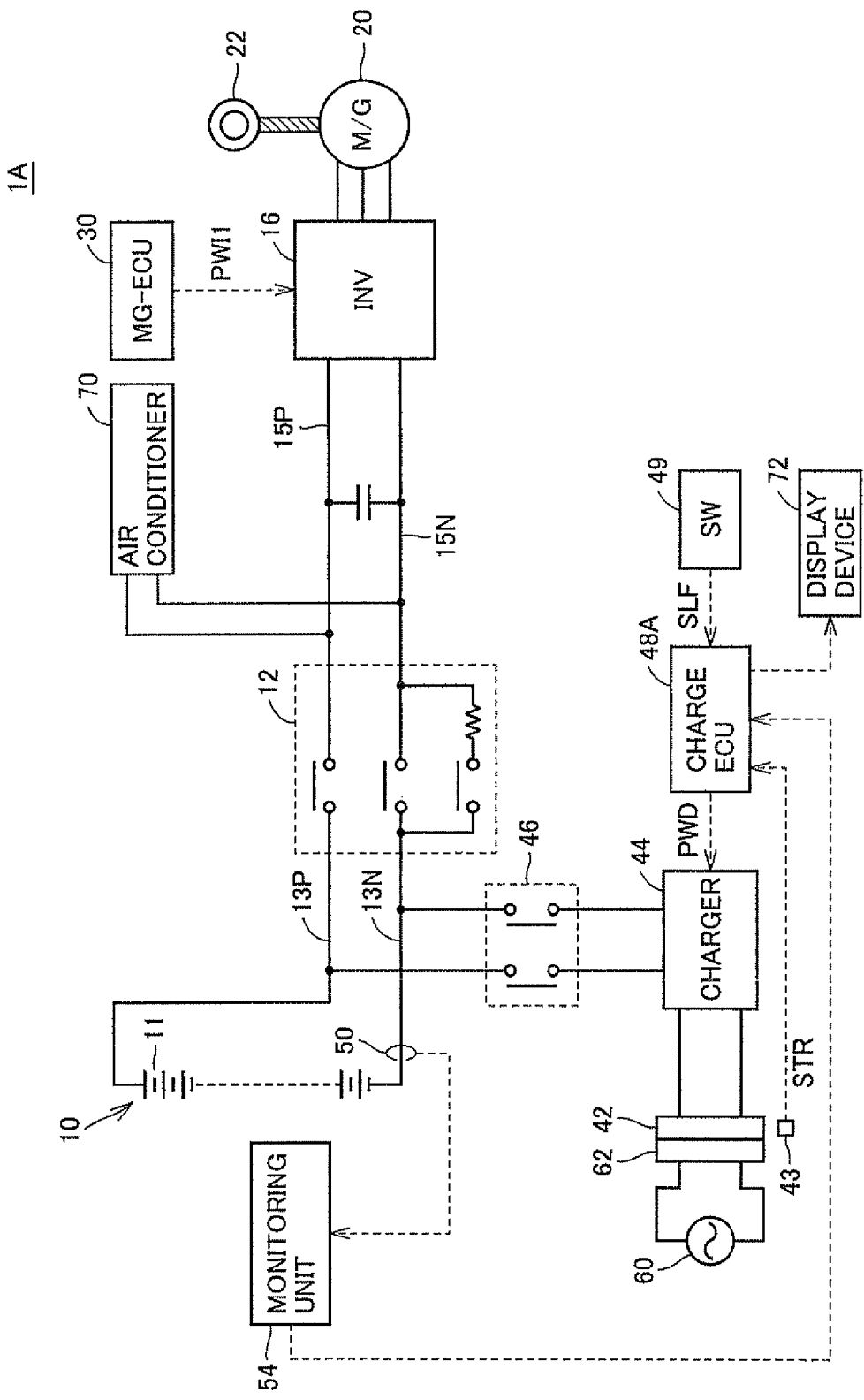
FIG. 8 is an overall block diagram of a vehicle in accordance with Embodiment 2 of the present invention.

FIG. 8 is an overall block diagram of a vehicle in accordance with Embodiment 2 of the present invention. Referring to FIGS. 8 and 1, a vehicle 1A is different from vehicle 1 in that it additionally includes a display device 72 and that it includes, in place of charge ECU 48, a charge ECU 48A.

Charge ECU 48A calculates the cruising distance in the normal mode and the cruising distance in the long life mode. Further, charge ECU 48A outputs information related to the cruising distance to display device 72. Display device 72 receives the information related to the cruising distance from charge ECU 48A, and displays the information. The "cruising distance in the normal mode" refers to the distance vehicle 1A can travel when the range of variation of SOC during traveling of vehicle 1A is in the first range R1. The "cruising distance in the long life mode" refers to the distance vehicle 1A can travel when the range of variation of SOC during traveling of vehicle 1A is in the second range R2.

Figure 9:
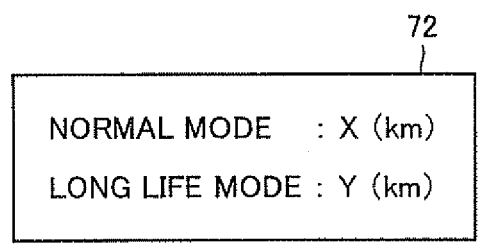
FIG. 9 shows a first example of display on the display device shown in FIG. 8.

FIG. 9 shows a first example of display on the display device shown in FIG. 8. Referring to FIG. 9, the cruising distance (X (km)) in the normal mode and the cruising distance (Y (km)) in the long life mode are displayed on the screen of display device 72. The cruising distances X and Y are cruising distances based on the present state of deterioration of battery 10.

Figure 10:
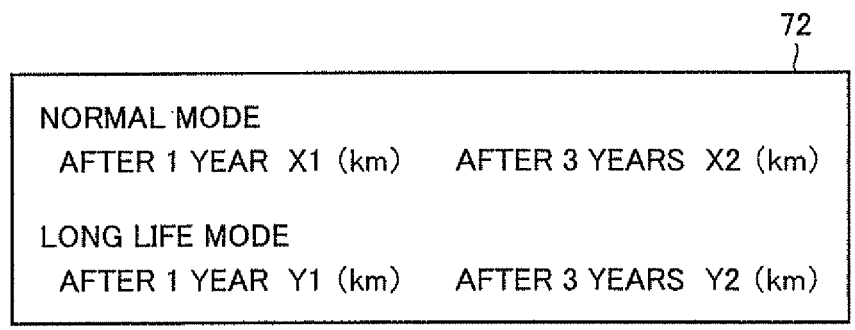
FIG. 10 shows a second example of display on the display device shown in FIG. 8.

FIG. 10 shows a second example of display on the display device shown in FIG. 8. Referring to FIG. 10, cruising distances after a prescribed time period from the present time are displayed. When the normal mode is selected, the cruising distance after 1 year from the present time is X1 (km), and the cruising distance after three years from the present time is X2 (km). Similarly, when the long life mode is selected, the cruising distance after 1 year from the present time is Y1 (km) and the cruising distance after three years from the present time is Y2 (km). Each of the cruising distances X1, X2, Y1 and Y2 shown in FIG. 10 represents the cruising distance expected in the future if the charging mode is fixed either to the normal mode or the long life mode. The indications of "1 year" and "3 years" are examples in the present embodiment.

The cruising distances shown in FIGS. 9 and 10 are displayed on display device 72 by the user operating display device 72. It is noted, however, that the cruising distance may be displayed on display device 72 by, for example, a special operation of display device 72 at the time of maintenance of vehicle 1A.

Figure 11:
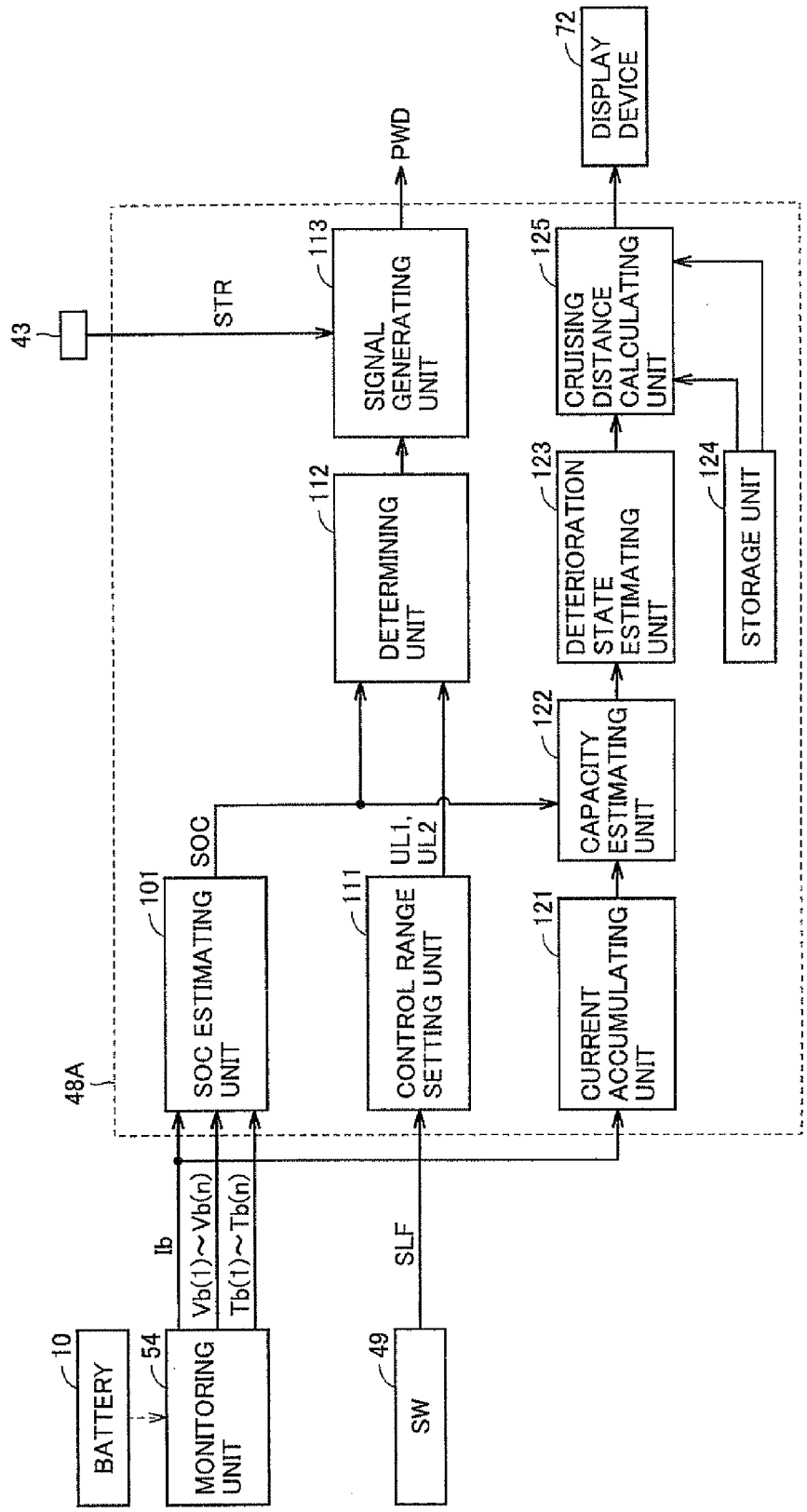
FIG. 11 is a functional block diagram of the charge ECU shown in FIG. 8.

FIG. 11 is a functional block diagram of the charge ECU shown in FIG. 8. Referring to FIGS. 11 and 3, charge ECU 48A is different from charge ECU 48 in that it additionally includes a current accumulating unit 121, a capacity estimating unit 122, a deterioration state estimating unit 123, a storage unit 124 and a cruising distance calculating unit 125.

Current accumulating unit 121 accumulates the current value Ib received from monitoring unit 54. In the present embodiment, it is assumed that the current accumulation value when SOC reaches 100(%) equals to the present capacity of battery 10. Capacity estimating unit 122 receives the accumulated value of current value Ib calculated by current accumulating unit 121 and SOC estimated by SOC estimating unit 101. Deterioration state estimating unit 123 calculates the present capacity of battery 10 based on the amount of increase of SOC with respect to the accumulated value of current value Ib. The present capacity of battery 10 calculated by capacity estimating unit 122 is transmitted from capacity estimating unit 122 to deterioration state estimating unit 123.

Deterioration state estimating unit 123 estimates the state of deterioration of battery 10. More specifically, deterioration state estimating unit 123 calculates SOH (State of Health) representing the degree of deterioration of battery 10. In the present embodiment, SOH is defined as the ratio of present capacity of battery 10 with respect to the initial capacity of battery 10.

The initial capacity of battery 10 is stored as a prescribed value in deterioration state estimating unit 123. Deterioration state estimating unit 123 calculates SOH based on the initial capacity and the capacity of battery 10 estimated by capacity estimating unit 122.

Storage unit 124 stores the deterioration characteristic of battery 10. The deterioration characteristic of battery 10 represents correlation between the age of service of battery 10 and SOH. Further, storage unit 124 stores correlation between the age of service of battery 10 and the cruising distance of vehicle 1. In Embodiment 2, it is assumed that age of service of battery 10 is the same as that of vehicle 1A.

Figure 12:
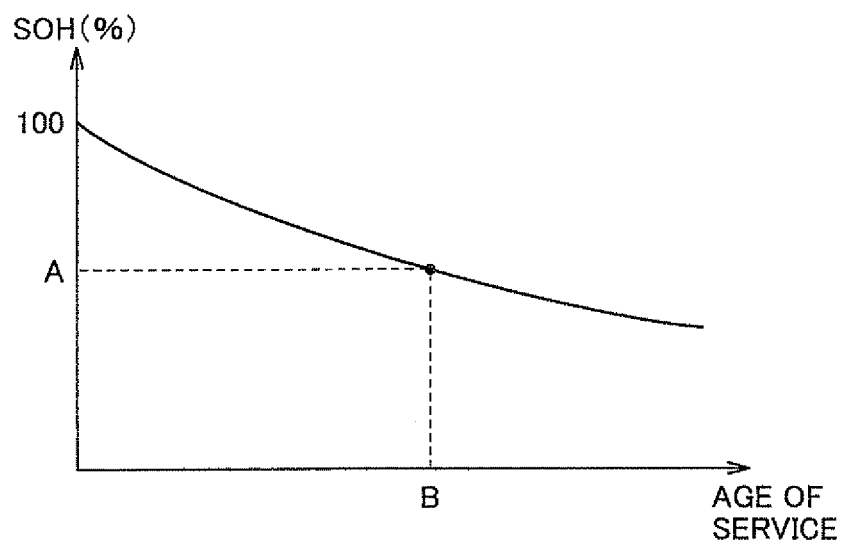
FIG. 12 is a graph showing battery deterioration characteristic stored in the storage unit shown in FIG. 11.

FIG. 12 is a graph showing battery deterioration characteristic stored in the storage unit shown in FIG. 11. Referring to FIG. 12, as the age of service of battery 10 becomes longer, SOH lowers. According to the deterioration characteristic, when SOH is A (%), the age of service of battery 10 is B (years).

Figure 13:
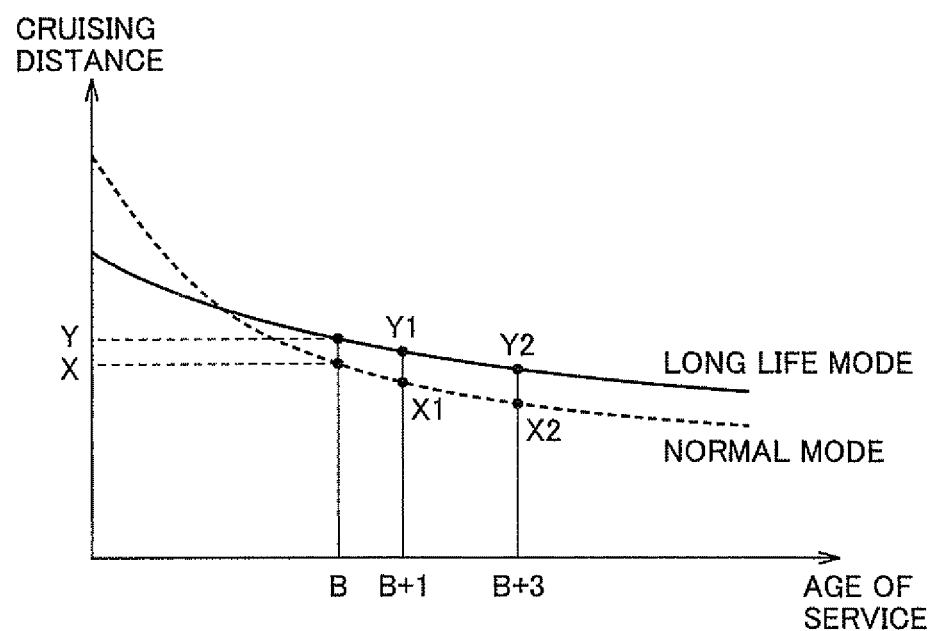
FIG. 13 is a graph showing correlation between age of service of the battery and the cruising distance of the vehicle, stored in the storage unit shown in FIG. 11.

FIG. 13 is a graph showing correlation between age of service of the battery and the cruising distance of the vehicle, stored in the storage unit shown in FIG. 11. Referring to FIG. 13, as the age of service of battery 10 becomes longer, the cruising distance of vehicle 1A becomes shorter. FIG. 13 shows that based on the control range of SOC at the time of charging battery 10 and on the age of service of battery 10, the cruising distance of vehicle 1A can be calculated. More specifically, FIG. 13 shows the distance vehicle 1A can travel when battery 10 is charged in the normal mode and the range of variation of SOC during traveling of vehicle 1A is the first range R1 ("normal mode" in FIG. 13). FIG. 13 also shows the distance vehicle 1A can travel when battery 10 is charged in the long life mode and the range of variation of SOC during traveling of vehicle 1A is the second range R2 ("long life mode" in FIG. 13).

If the normal mode is selected as the charging mode, the cruising distance corresponding to B (years) is X (km). On the other hand, if the long life mode is selected as the charging mode, the cruising distance corresponding to B (years) is Y (km).

The deterioration characteristic shown in FIG. 12 and the correlation between the age of service of battery and the cruising distance of the vehicle shown in FIG. 13 are obtained, for example, by experiments repeating charging and discharging of the battery based on prescribed travel patterns of the vehicle.

Returning to FIG. 11, cruising distance calculating unit 125 estimates the cruising distance in the normal mode based on the degree of deterioration (SOH) of battery 10 and on the first range (R1). Further, cruising distance calculating unit 125 estimates the cruising distance in the long life mode based on the degree of deterioration (SOH) and the second range (R2). As described above, FIG. 13 shows that the cruising distance of vehicle 1A can be calculated based on the control range of SOC at the time of charging battery 10 and on the age of service of battery 10. The age of service shown in FIG. 13 is determined in accordance with the degree of deterioration of battery 10. Therefore, cruising distance calculating unit 125 can estimate the cruising distance based on the control range of SOC and on the degree of deterioration of battery 10.

More specifically, cruising distance calculating unit 125 obtains the age of service of battery 10 based on the deterioration characteristic (see FIG. 13) stored in storage unit 124 and SOH calculated by deterioration state estimating unit 123. The age of service (B) is used for calculating the cruising distance and it may be different from the actual age of service. Further, based on the age of service (B) and the correlation between the age of service and the cruising distance (see FIG. 14), cruising distance calculating unit 125 estimates the cruising distance at the end of charging of battery 10. At this time, cruising distance calculating unit 125 estimates the cruising distance in the long life mode and the cruising distance in the normal mode.

Cruising distance calculating unit 125 outputs these cruising distances (X, Y) to display device 72. Display device 72 displays the cruising distances (X, Y) calculated by cruising distance calculating unit 125 (see FIG. 9).

Figure 14:
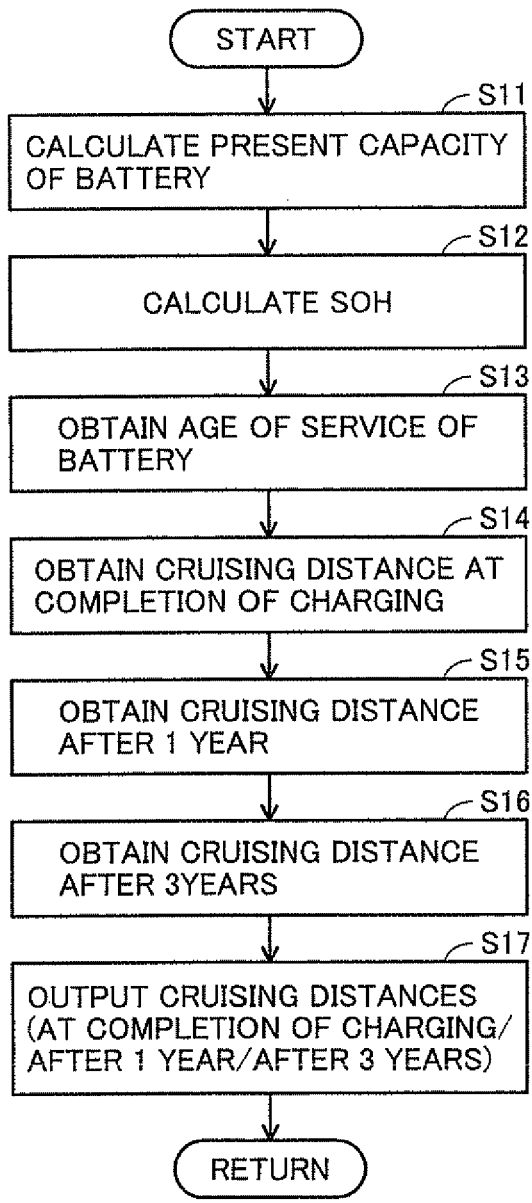
FIG. 14 is a flowchart representing the display process executed by the charge ECU shown in FIG. 9.

Further, cruising distance calculating unit 125 obtains the cruising distances (X1, Y1) at the year (B+1) and (X2, Y2) at the year (B+3), based on the correlation between the age of service and the cruising distance (see FIG. 14). X1 and X2 are both cruising distances in the normal mode. Y1 and Y2 are cruising distances in the normal mode.

Cruising distance calculating unit 125 outputs services of age (B+1, B+3) and cruising distances (X1, X2, Y1, Y2) to display device 72. Display device 72 displays the cruising distances (X1, X2, Y1, Y2) calculated by cruising distance calculating unit 125 in association with the charging mode (normal mode and long life mode) and the age of service (B+1, B+3).

FIG. 14 is a flowchart representing the display process executed by the charge ECU shown in FIG. 9. This process is executed while battery 10 is charged from power source 60 or after the charging of battery 10 is completed.

Referring to FIG. 14, at step S11, charge ECU 48A calculates the present capacity of battery 10 based on the amount of increase of SOC with respect to the accumulated value of current value Ib. At step S12, charge ECU 48A calculates SOH of battery 10, based on the present capacity of battery 10 and the initial capacity of battery 10. At step S13, charge ECU 48A obtains the age of service of battery 10, based on the deterioration characteristic (see FIG. 13) and SOH. The age of service here is a tentative value for calculating the cruising distance.

At step S14, charge ECU 48A obtains the cruising distance at the completion of charging of battery 10, based on the age of service of battery 10 obtained at step S13 and on the correlation between the age of service and the cruising distance (see FIG. 14). In this manner, charge ECU 48A obtains the present cruising distance.

At step S15, charge ECU 48A obtains the cruising distance one year from the present time, based on the correlation between the age of service and the cruising distance (FIG. 14) and the age of service obtained at step S13. At step S16, charge ECU 48A obtains the cruising distance three years after the present time, based on the correlation between the age of service and the cruising distance (FIG. 14) and on the age of service obtained at step S13.

At step S17, charge ECU 48A outputs the cruising distance at the completion of charging of battery 10, the cruising distance one year after the present time and the cruising distance three years after the present time, on display device 72. Display device 72 displays these cruising distances.

Charge ECU 48A obtains both the cruising distances (X1, X2) for the normal mode and the cruising distances (Y1, Y2) for the long life mode, at steps S14 to S16. Based on the state of switch 49, charge ECU 48A may selectively obtain either one of the cruising distances for the normal mode and for the long life mode. In that case, when user operates switch 49, the cruising distances displayed on display device 72 may be switched between the cruising distances for the normal mode and the cruising distances for the long life mode.

Specifically, when the signal SLF is generated, charge ECU 48A obtains the cruising distances (Y, Y1, Y2) corresponding to the long life mode at steps S14 to S16. If generation of the signal SLF is stopped, charge ECU 48A obtains the cruising distances (X, X1, X2) corresponding to the normal mode at steps S14 to S16. If switch 49 is on, display device 72 displays only the cruising distances (Y, Y1, Y2) corresponding to the long life mode. On the other hand, if switch 49 is off, display device 72 displays only the cruising distances (X, X1, X2) corresponding to the normal mode.

Charge ECU 48A executes the process shown in the flowchart of FIG. 5 for charging battery 10.

According to Embodiment 2, similar effects as in Embodiment 1 can be attained. Further, in Embodiment 2, cruising distances are displayed on the display device. Therefore, the following effects, for example, can be attained.

When the user selects either the normal mode or the long life mode, the information related to the cruising distance can be presented to the user. Therefore, Embodiment 2 can improve convenience for the user.

For example, the user or the like can recognize the degree of deterioration of the battery. Thus, usable life of the vehicle can be evaluated, or necessity of battery exchange can be determined.

Embodiment 3

Figure 15:
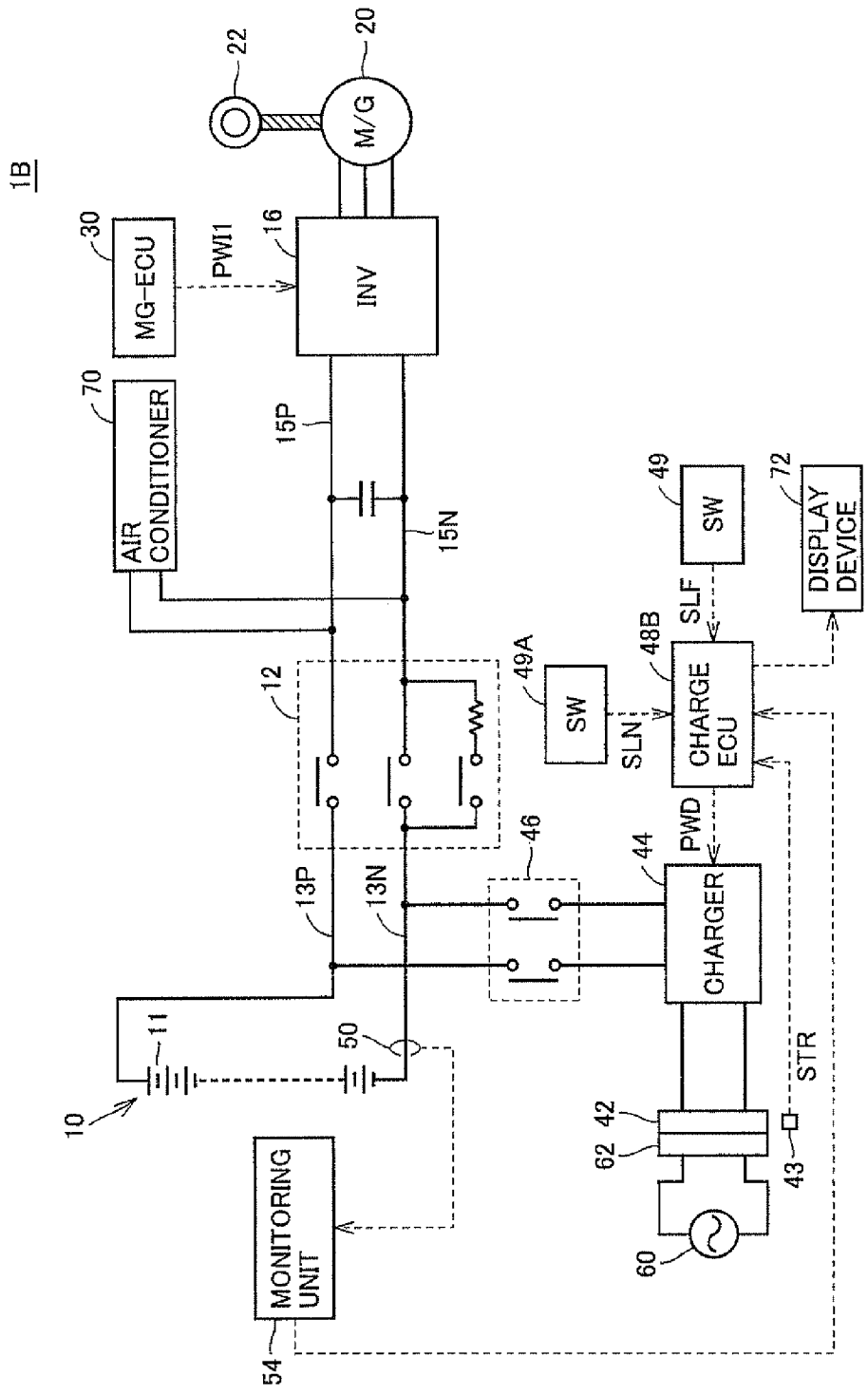
FIG. 15 is an overall block diagram of a vehicle in accordance with Embodiment 3 of the present invention.

FIG. 15 is an overall block diagram of a vehicle in accordance with Embodiment 3 of the present invention. Referring to FIGS. 15 and 1, a vehicle 1B is different from vehicle 1 in that it includes a charge ECU 48B in place of charge ECU 48 and that it additionally includes a switch 49A.

Charge ECU 48B sets the control range of SOC in the long life mode by learning use history of battery 10. Specifically, charge ECU 48B sets the upper limit value of control range based on the use history of battery 10.

The history of range of variation of SOC with the travel of vehicle 1B is stored in charge ECU 48B. For instance, if vehicle 1B travels for a short distance, the range of variation of SOC is smaller than and within the control range of SOC. In such a case, charge ECU 48B lowers the upper limit value in the long life mode.

Vehicle 1B further includes switch 49A. Switch 49A is turned on/off by a user operation.

When switch 49A is on, switch 49A outputs a signal SLN to charge ECU 48B. The signal SLN is a signal indicating that a learning mode is selected. Based on the signal SLN, charge ECU 48B determines that the learning mode is set. In this case, charge ECU 48B learns the use history of battery 10 and, based on the use history, sets the upper limit value of SOC in the long life mode.

On the other hand, if the user turns off switch 49A, switch 49A stops output of signal SLN. In this case, charge ECU 48B determines that setting of learning mode is cancelled, and sets the upper limit value of SOC in the long life mode to an initial value (fixed value).

Figure 16:
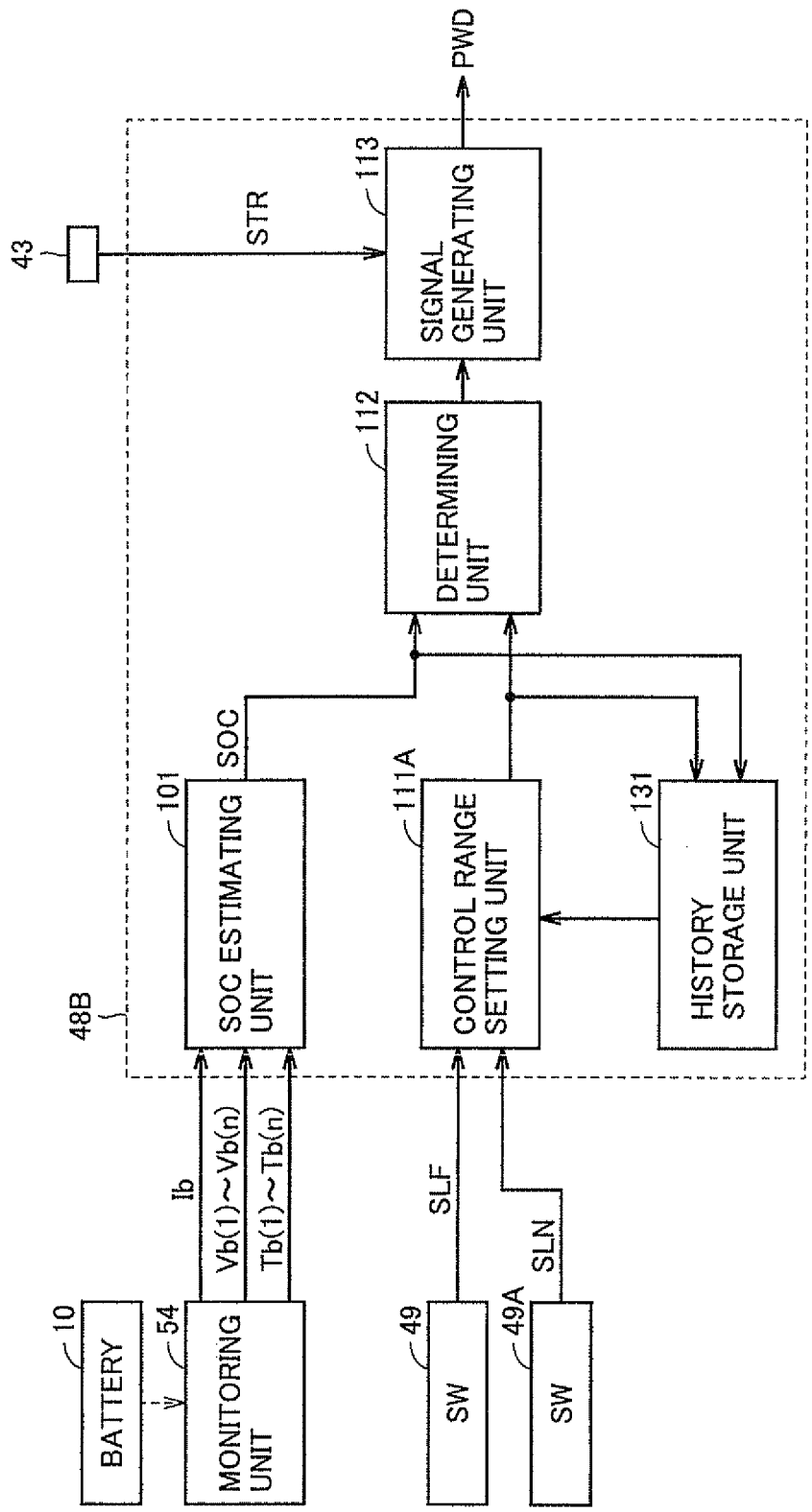
FIG. 16 is a functional block diagram of the charge ECU shown in FIG. 15.

FIG. 16 is a functional block diagram of the charge ECU shown in FIG. 15. Referring to FIGS. 16 and 3, charge ECU 48B is different from charge ECU 48 in that it additionally includes a history storage unit 131 and that it includes a control range setting unit 111A in place of control range setting unit 111.

History storage unit 131 stores the use history of battery 10. FIG. 17 shows use history of the battery stored in the history storage unit shown in FIG. 16. Referring to FIG. 17, history storage unit 131 obtains, as the SOC at the start of travel of vehicle 1B, the SOC at the charge completion of battery 10 this time. The SOC at the completion of charging of battery 10 equals to the upper limit value. History storage unit 131 obtains SOC from SOC estimating unit 101 at the start of next charging of battery 10, and stores the SOC as the SOC at the end of travel of vehicle 1B. The upper limit values (Ua, Ub, Uc etc.) and lower limit values (La, Lb, Lc etc.) of the range of variation in SOC are related to the number of use of the vehicle.

Returning to FIG. 16, when the signal SLN is output from switch 49A, control range setting unit 111A learns the range of variation of SOC by reading the use history stored in history storage unit 131. Control range setting unit 111A sets the upper limit value of SOC based on the range of variation of SOC.

Figure 18:
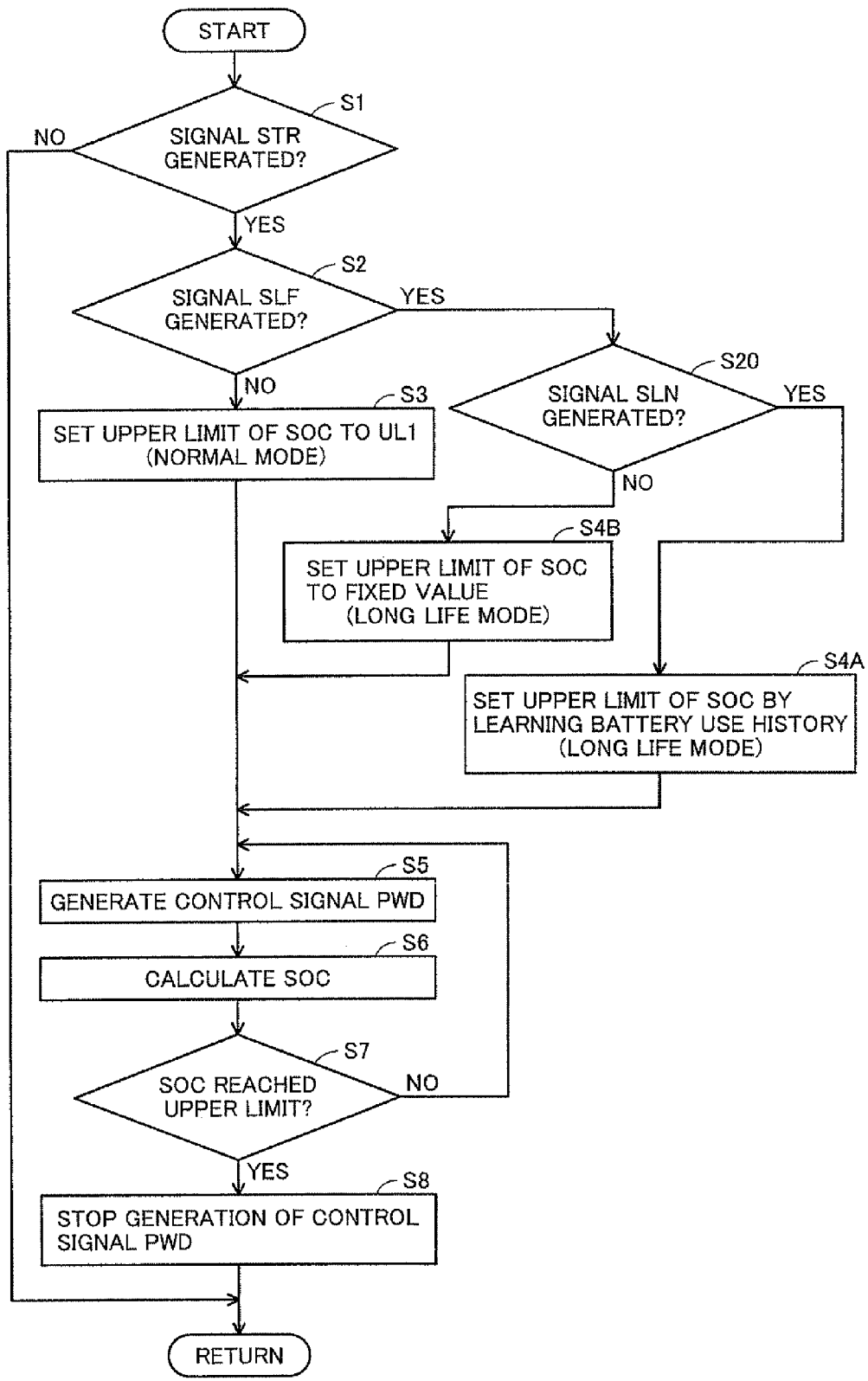
FIG. 18 is a flowchart representing control of battery charging executed by the charge ECU shown in FIG. 15.

FIG. 18 is a flowchart representing control of battery charging executed by the charge ECU shown in FIG. 15. The process shown in the flowchart is executed at a prescribed time interval or every time prescribed conditions are satisfied. Referring to FIGS. 18 and 5, the flowchart of FIG. 18 is different from the flowchart of FIG. 5 in that it additionally includes the process of step S20 and that it includes the process of steps S4A and S4B in place of step S4.

The process of step S20 is executed if charge ECU 48B determines that the signal SLF is generated (YES at step S2). At step S20, charge ECU 48B determines whether or not the signal SLN is generated. The signal SLN is generated when switch 49 is turned on. Generation of the signal SLN means setting of the learning mode.

If it is determined that the signal SLN is generated (YES at step S20), charge ECU 48B executes the process of step S4A. At step S4A, charge ECU 48B learns the use history of battery 10 and thereby sets the upper limit of the control range of SOC. On the other hand, if it is determined that the signal SLN is not generated (NO at step S20), at step S4B, charge ECU 48B sets the upper limit value (UL2) of the control range of SOC to a fixed value. After the end of the process of step S4A or S4B, the process of step S5 is executed.

Figure 19:
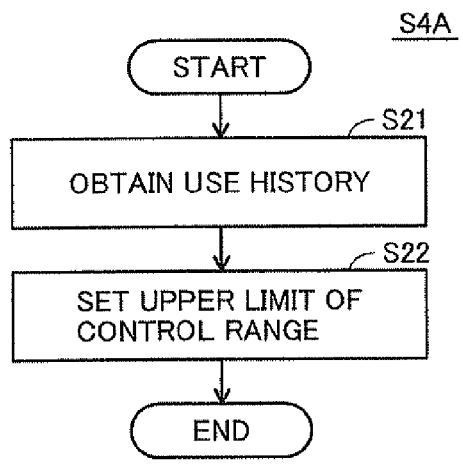
FIG. 19 is a flowchart representing an example of the process at step S4A shown in FIG. 18.

FIG. 19 is a flowchart representing an example of the process at step S4A shown in FIG. 18. Referring to FIG. 19, at step S21, charge ECU 48B obtains the use history of battery 10 at step S21. Control range setting unit 111A learns the use history stored in history storage unit 131, that is, the transition of the range of variation of SOC. At step S22, charge ECU 48B sets the upper limit value of control range, based on the use history of battery 10.

Figure 20:
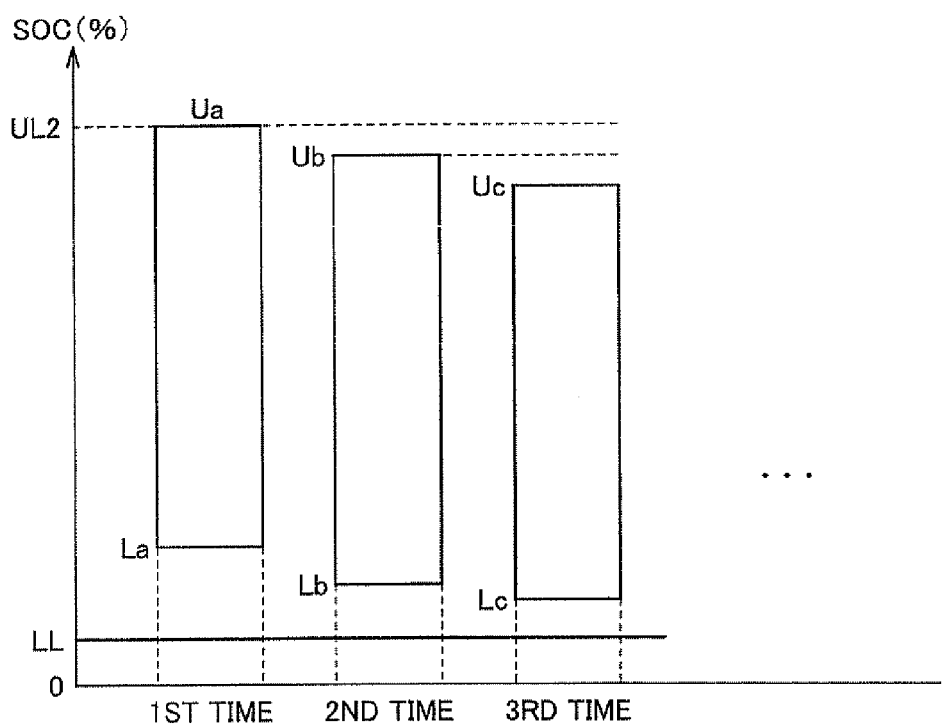
FIG. 20 shows an example of learning of the SOC control range by a control range setting unit 111A.

FIG. 20 shows an example of learning of the SOC control range by a control range setting unit 111A. Referring to FIG. 20, by the first travel of vehicle 1B after the setting of learning mode, SOC lowers from Ua to La. The upper limit value UL2 for the first travel of vehicle 1B is Ua. The value Ua is a predetermined value. The lower limit value La is larger than the lower limit value LL of the control range. Since La>LL, charge ECU 48B lowers the upper limit value Ua to Ub. The amount of lowering of the upper limit value is determined, for example, based on the difference between La and LL. It is noted, however, that SOC should not be lower than the lower limit value LL during running of vehicle 1B. Thus, the amount of lowering of the upper value may be limited.

By the second use of the vehicle, SOC changes from Ub to Lb. The lower limit value Lb is larger than the lower limit value LL of the control range. Here again, charge ECU 48B lowers the upper limit value Ub to Uc. The amount of lowering of the upper limit value is determined, for example, based on the difference between Lb and LL. By the third use of the vehicle, SOC changes from Uc to Lc. The lower limit value Lc is larger than the lower limit value LL of the control range. Here again, charge ECU 48B lowers the upper limit value. Every time the vehicle is used, the upper limit is changed in accordance with the method described above.

Figure 21:
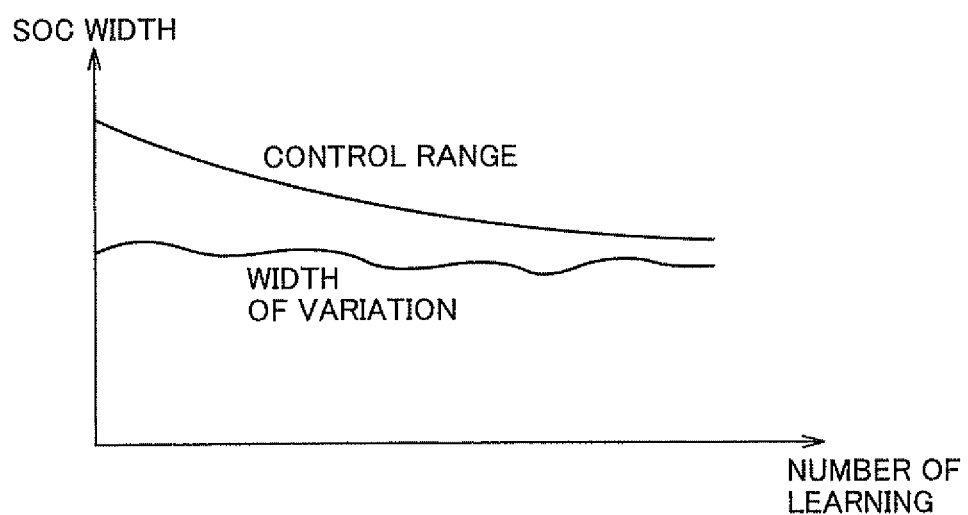
FIG. 21 is a graph showing a relation between the number of learning of battery use history and the width of SOC.

FIG. 21 is a graph showing a relation between the number of learning of battery use history and the width of SOC. Referring to FIG. 21, as the number of learning increases, the width of control range of SOC becomes closer to the width of variation of SOC. In order to prevent over-discharge of battery 10, the lower limit of control range is a fixed value. Specifically, FIG. 21 shows that the upper limit of control range lowers as the number of learning increases.

According to Embodiment 3, charge ECU 48B sets the upper limit value of the control range of SOC in the long life mode, based on the use history of the battery. When short-distance travel of vehicle 1B is repeated, the upper limit value is decreased gradually. As the upper limit value of the control range lowers, it becomes possible to prevent battery 10 from being kept at the high SOC state for a long time.

According to Embodiments 1 and 2, since battery 10 is charged in the long life mode, it is possible to prevent battery 10 from being kept at the high SOC state for a long time. According to Embodiment 3, the upper limit value of SOC in the long life mode can be lowered. Therefore, according to Embodiment 3, deterioration of battery 10 can more effectively be reduced.

Further, according to Embodiment 3, vehicle 1B has a switch 49A operated by the user. When the user turns on switch 49A, the learning mode is set. On the other hand, when the user turns off switch 49A, setting of the learning mode is canceled. If short-distance travel of vehicle 1B is repeated as described above, the control range of SOC becomes gradually narrower. If travel of longer distance than usual is necessary, the user may turn off switch 49A to stop the output of signal SLN and to cancel the learning mode.

When the setting of learning mode is cancelled, the upper limit value in the long life mode is set to the initial value (fixed value). Thus, convenience for the user can be improved. By way of example, if the initial value is higher than the value set in the learning mode, the control range of SOC becomes wider. It is noted, however, that since the charging mode is set to the long life mode, the upper limit value thereof is lower than the upper limit value UL1 in the normal mode. Therefore, it is possible to prevent deterioration of battery 10 and, at the same time, travel for a longer distance than usual becomes possible.

Charge ECU 48B may set the upper limit value of SOC by learning the travel distance of vehicle 1B, Embodiment 4

Figure 22:
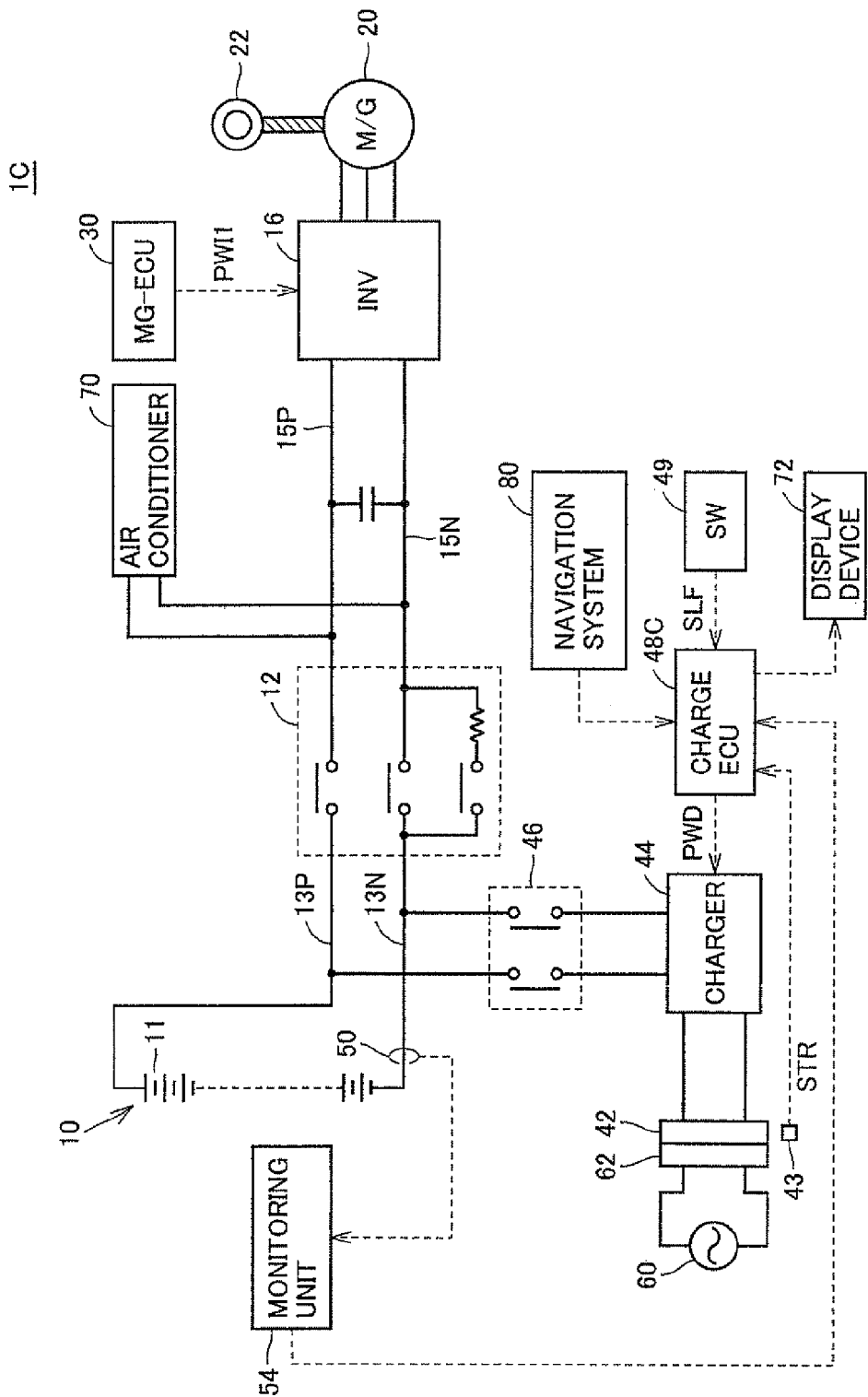
FIG. 22 is an overall block diagram of a vehicle in accordance with Embodiment 4 of the present invention.

FIG. 22 is an overall block diagram of a vehicle in accordance with Embodiment 4 of the present invention. Referring to FIGS. 22 and 1, a vehicle 1C is different from vehicle 1 in that it includes a charge ECU 48C in place of charge ECU 48, and that it additionally includes a display device 72 and a navigation system 80.

Navigation system 80 sets, when the user sets a target destination, a route of travel from the current position of vehicle 1C to the target destination. Charge ECU 48C sets the control range of SOC based on the route of travel. Here, the upper limit value of control range is determined such that vehicle 1C can travel the entire route. If the upper limit value of the control range exceeds a fixed value (standard value), charge ECU 48C causes display device 72 to display a pieces of information notifying that switch 49 must be turned off. This piece of information may be displayed on a display unit (not shown) of navigation system 80. Thus, the user is notified of the necessity of turning off switch 49.

Figure 23:
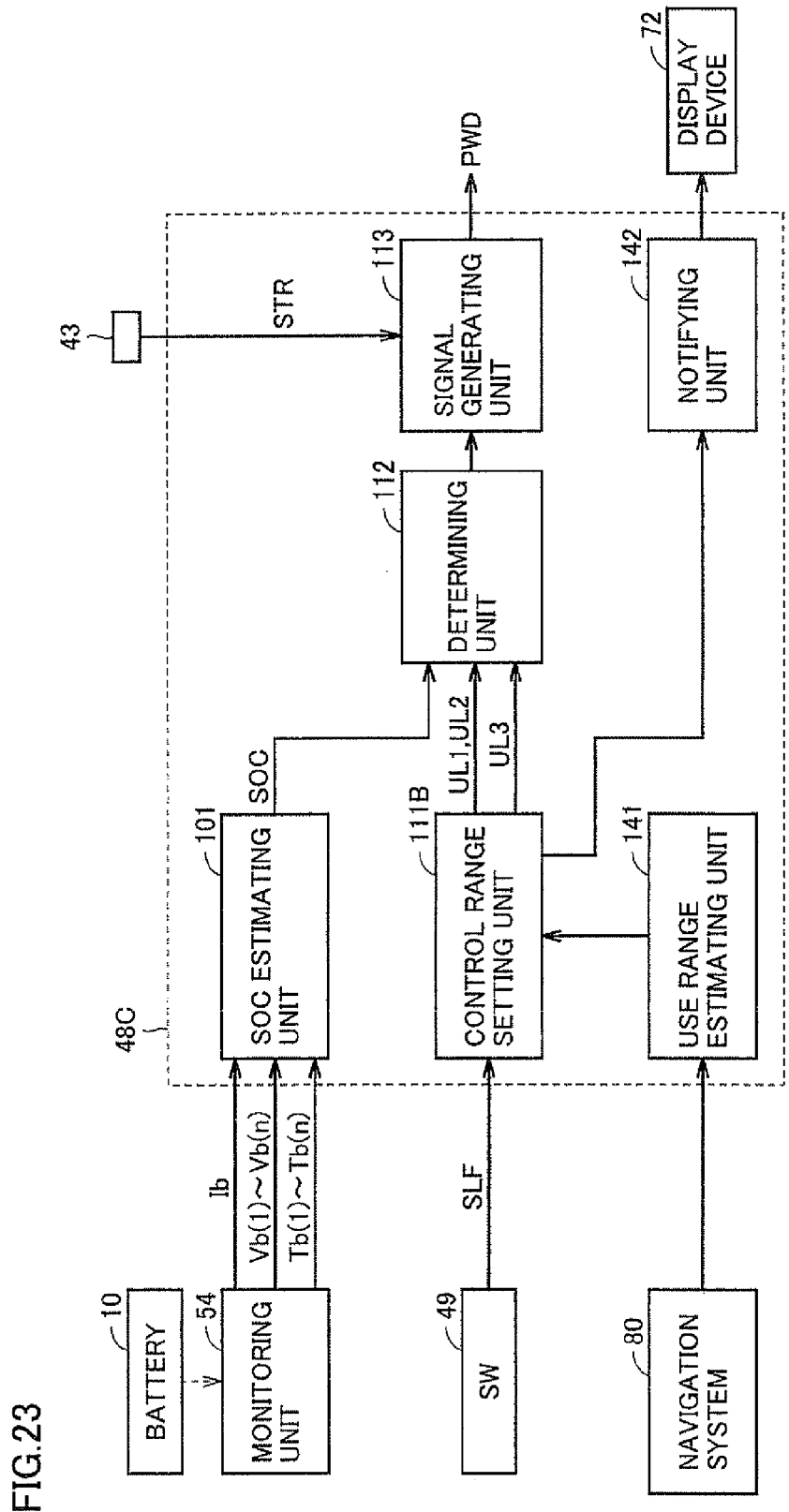
FIG. 23 is a functional block diagram of the charge ECU shown in FIG. 22.

FIG. 23 is a functional block diagram of the charge ECU shown in FIG. 22. Referring to FIGS. 23 and 3, charge ECU 48C is different from charge ECU 48 in that it additionally includes a use range estimating unit 141 and a notifying unit 142. Further, charge ECU 48C is different from charge ECU 48 in that it includes control range setting unit 111B in place of control range setting unit 111.

Use range estimating unit 141 obtains information of the route of travel from navigation system 80. The information includes, for example, the length of the route of travel. Use range estimating unit 141 estimates the range of use of SOC based on the information of travel route. The "use range of SOC" means the range of variation of SOC while battery 10 is used. By way of example, the amount of electric power necessary for vehicle 1C to move a unit distance is calculated in advance. Use range estimating unit 141 estimates the use range based on the length of the travel route and the amount of electric power.

Control range setting unit 111B sets an upper limit value UL3 of the SOC control range based on the use range estimated by use range estimating unit 141. If the long life mode is set and the use range is estimated, the upper limit value UL3 is set. Control range setting unit 111B determines that the long life mode is set as it receives the signal SLF from switch 49.

If the upper limit value UL3 is larger than the fixed value, control range setting unit 111B transmits a piece of information indicating that upper limit value UL3 is larger than the fixed value, to notifying unit 142. Based on the piece of information from control range setting unit 111B, notifying unit 142 displays a piece of information to notify the user that switch 49 must be turned off, such as a prescribed message, on display unit 72.

Figure 24:
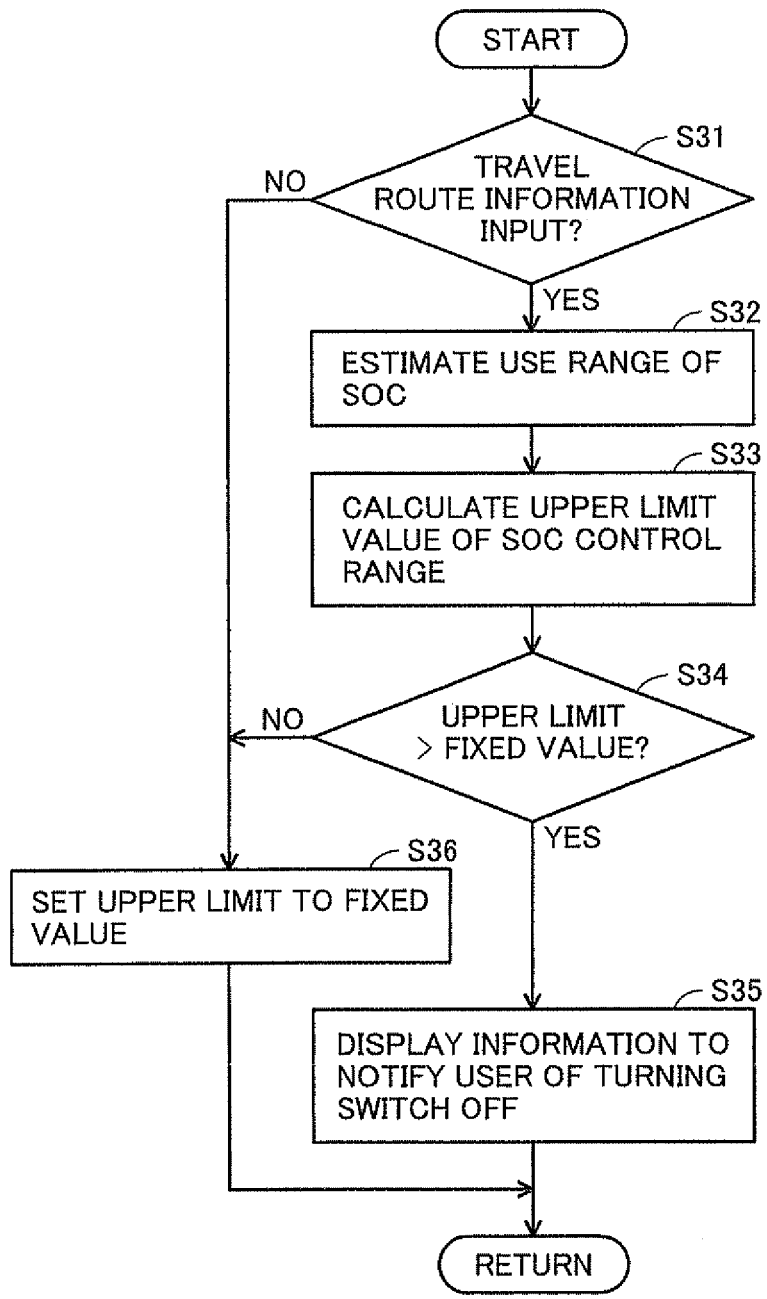
FIG. 24 is a flowchart representing an upper limit setting process executed by the charge ECU shown in FIG. 22.

FIG. 24 is a flowchart representing an upper limit setting process executed by the charge ECU shown in FIG. 22. The process is executed if the switch 49 is on, that is, if the long life mode is set.

Referring to FIG. 24, at step S31, charge ECU 48C determines whether or not the information of the route of travel is input from navigation system 80 to charge ECU 48C. If it is determined that the information of the route of travel is input to charge ECU 48C (YES at step S31), the process proceeds to step S32. On the other hand, if it is determined that the information of the route of travel is not input to charge ECU 48C (NO at step S31), the process of step S36 is executed. At step S36, charge ECU 48C sets the upper limit value of control range to a fixed value. The fixed value is, for example, the upper limit value UL2 shown in FIG. 4.

At step S32, charge ECU 48C estimates the use range of SOC based on the information of the route of travel. At step S33, charge ECU 48C calculates the upper limit value UL3 of the control range of SOC, based on the use range of SOC.

At step S34, charge ECU 48C determines whether or not the upper limit value UL3 of the control range of SOC is larger than the fixed value (UL2). If it is determined that the upper limit value is larger than the fixed value (YES at step S34), the process proceeds to step S35. At step S35, charge ECU 48C causes display unit 72 to display information to notify that switch 49 is to be turned off.

On the other hand, if it is determined that the upper limit value of the control range of SOC is smaller than the fixed value (NO at step S34), the process proceeds to step S36. At step S36, charge ECU 48C sets the upper limit of the control range to the fixed value (UL2). If the process at step S35 or S36 ends, the overall process returns to the main routine.

It is noted that charge ECU 48C executes the process shown in the flowchart of FIG. 5 for charging battery 10.

According to Embodiment 4, if the long life mode is set, the upper limit of the control range calculated based on the route of travel is compared with a fixed value. If the upper limit value is larger than the fixed value, the user is notified that switch 49 must be turned off. Specifically, information indicating necessity of turning off switch 49 is displayed on display device 72.

When the user turns off switch 49, charge ECU 48C sets the charging mode to the normal mode. As the charging mode is set to the normal mode, the upper limit value of the control range of SOC become higher and, therefore the amount of electric power stored in battery 10 can be increased. Thus, the cruising distance of vehicle 1C can be made longer and, hence, possibility that vehicle 1C can travel the preset route of travel becomes higher.

On the other hand, if switch 49 is kept on even after the information is displayed on display unit 72, battery 10 is charged in the long life mode. In that case, the upper limit value of the control range of SOC is limited to the fixed value (standard value). Therefore, deterioration of battery 10 can be reduced. If the charging mode is set to the long life mode and the upper limit set based on the route of travel is lower than the fixed value, battery 10 is charged until SOC reaches the fixed value. Therefore, deterioration of battery 10 can be reduced, and the cruising distance of vehicle 1C can be ensured.

Figure 25:
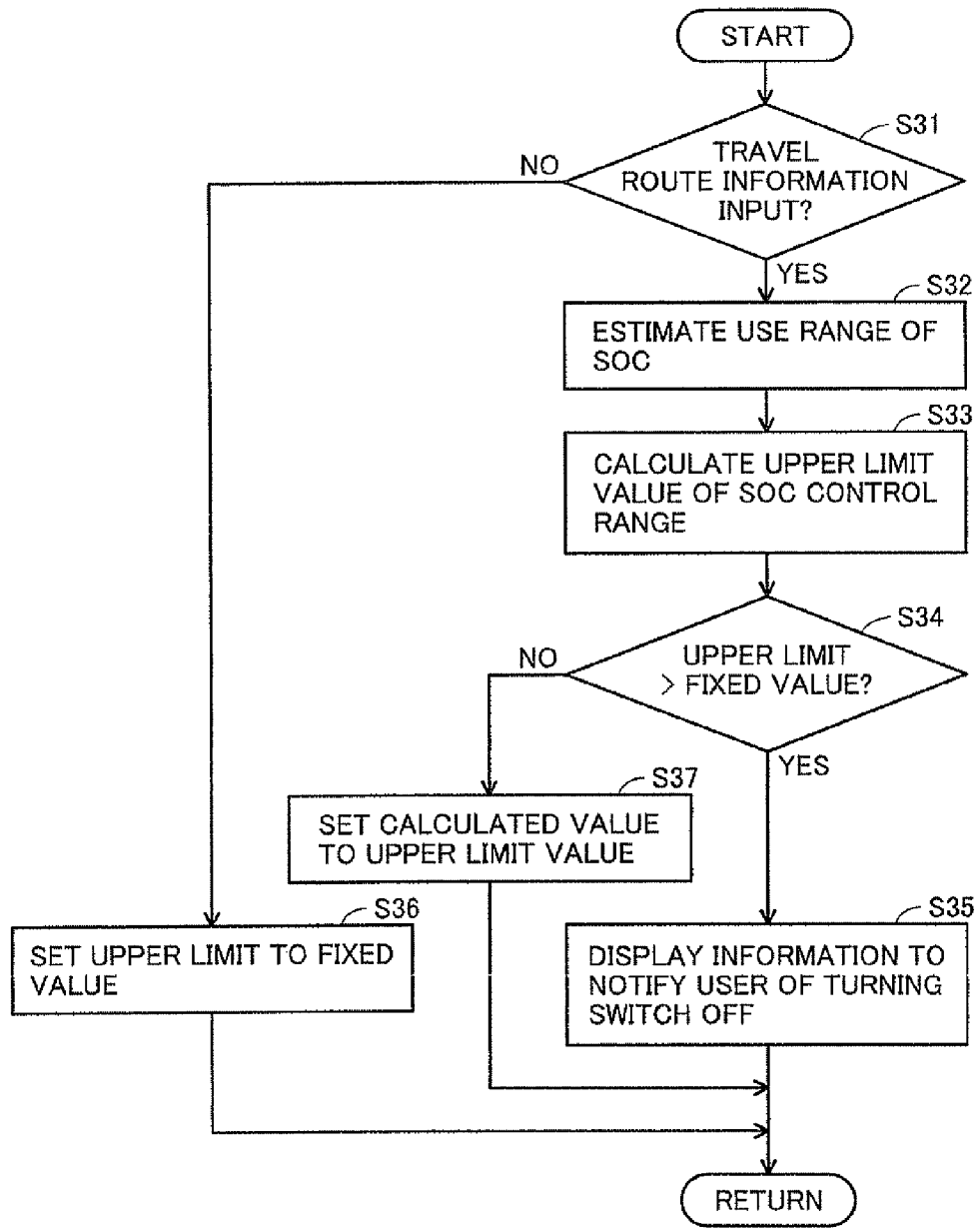
FIG. 25 is a flowchart showing another example of the upper limit setting process executed by the charge ECU shown in FIG. 22.

FIG. 25 is a flowchart showing another example of the upper limit setting process executed by the charge ECU shown in FIG. 22. Referring to FIGS. 25 and 24, the flowchart of FIG. 25 is different from the flowchart of FIG. 24 in that it additionally includes the process of step S37. At step S34, whether the upper limit value (UL3) calculated at step S33 is larger than the fixed value (UL2) is determined. If it is determined that UL3 is smaller than the fixed value (NO at step S34), the process of step S37 is executed.

At step S37, charge ECU 48C sets the calculated upper limit value (UL3) to the upper limit value of the control range of SOC. Therefore, the upper limit value in the long life mode is the same as the value calculated based on the route of travel. Here, the upper limit in the long life mode becomes lower and, therefore, deterioration of battery 10 can more effectively be reduced.

Further, charge ECU 48C may set the upper limit value of the control range of SOC by the following method, in the process of step S37. Charge ECU 48C sets the upper limit value by adding an offset value (margin value) to the calculated value (UL3). The offset value is determined based on the difference between the calculated value (UL3) and the fixed value (UL2), so that the upper limit value does not exceed the fixed value (UL2). Here again, the upper limit in the long life mode becomes lower and, therefore, deterioration of battery 10 can more effectively be reduced.

Embodiment 5

Figure 26:
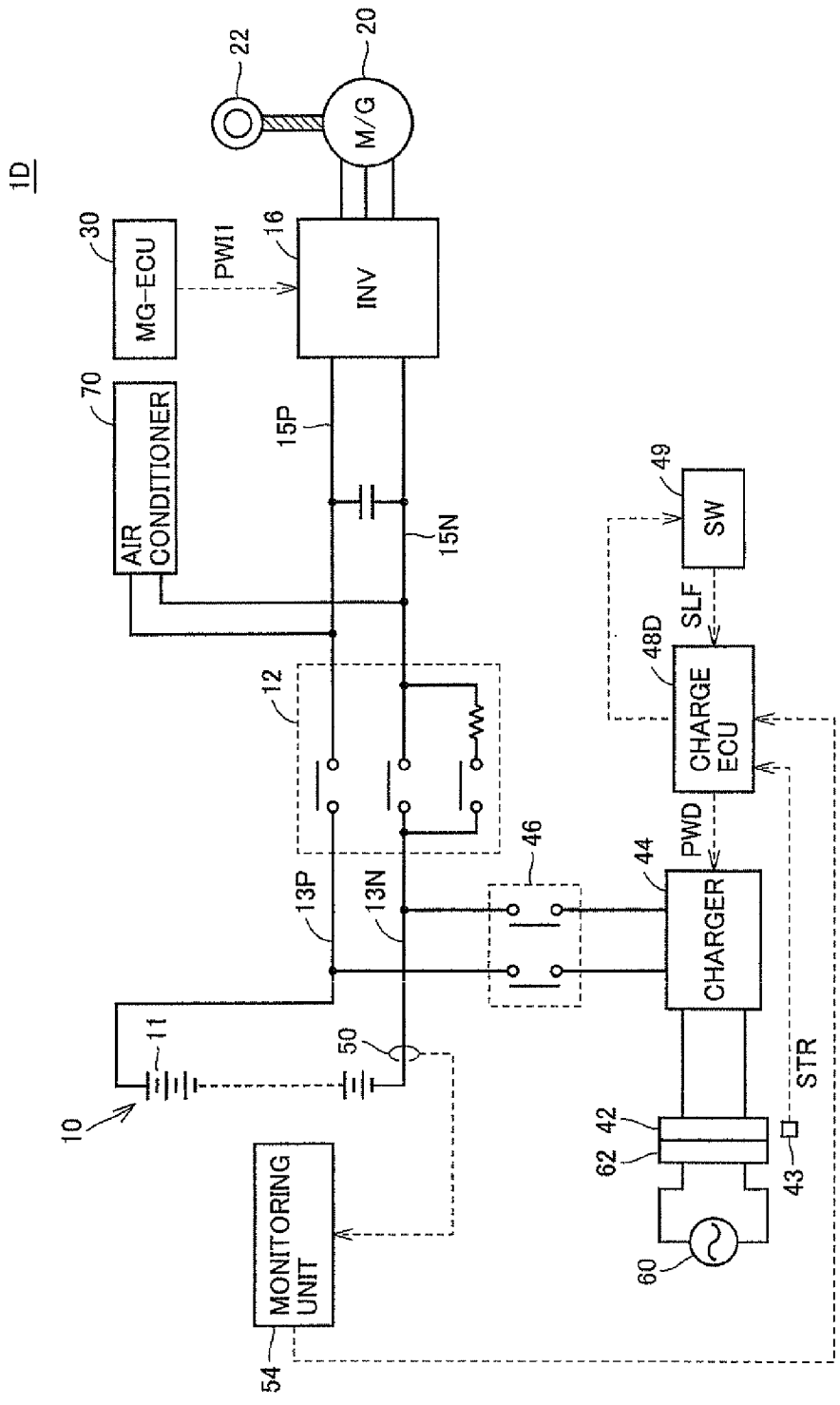
FIG. 26 is an overall block diagram showing a vehicle in accordance with Embodiment 5 of the present invention.

FIG. 26 is an overall block diagram showing a vehicle in accordance with Embodiment 5 of the present invention. Referring to FIGS. 26 and 1, a vehicle 1D is different from vehicle 1 in that it includes a charge ECU 48D in place of charge ECU 48. In Embodiment 5, charge ECU 48D controls switch 49 such that switch 49 is turned on in a default state. Switch 49 is on at the time of charging battery 10 unless the user operates switch 49. Therefore, in the default state, the charging mode is set to the long life mode.

If the user turns off switch 49 before starting charging of battery 10, battery 10 is charged in the normal mode. After the charging of battery 10 is completed, charge ECU 48D turns switch 49 from off to on. The timing of turning switch 49 from off to on is not specifically limited, provided that it is within the time period from the completion of charging this time until the start of next charging of battery 10. In the following description, it is assumed that switch 49 is switched from off to on when connector 62 is removed from charge inlet 42.

When connector 62 is removed from charge inlet 42, sensor 43 stops generation of the signal STR. The signal STR is input to charge ECU 48D. Therefore, charge ECU 48D can detect that connector 62 is removed from charge inlet 42.

In response to a command from charge ECU 48D, switch 49 is switched from off to on. It is noted, however, that switch 49 is turned on/off by a user operation, as in Embodiments 1 to 4. The configuration of switch 49 is not specifically limited. By way of example, switch 49 may be a switch displayed on a screen of a touch-panel display.

Figure 27:
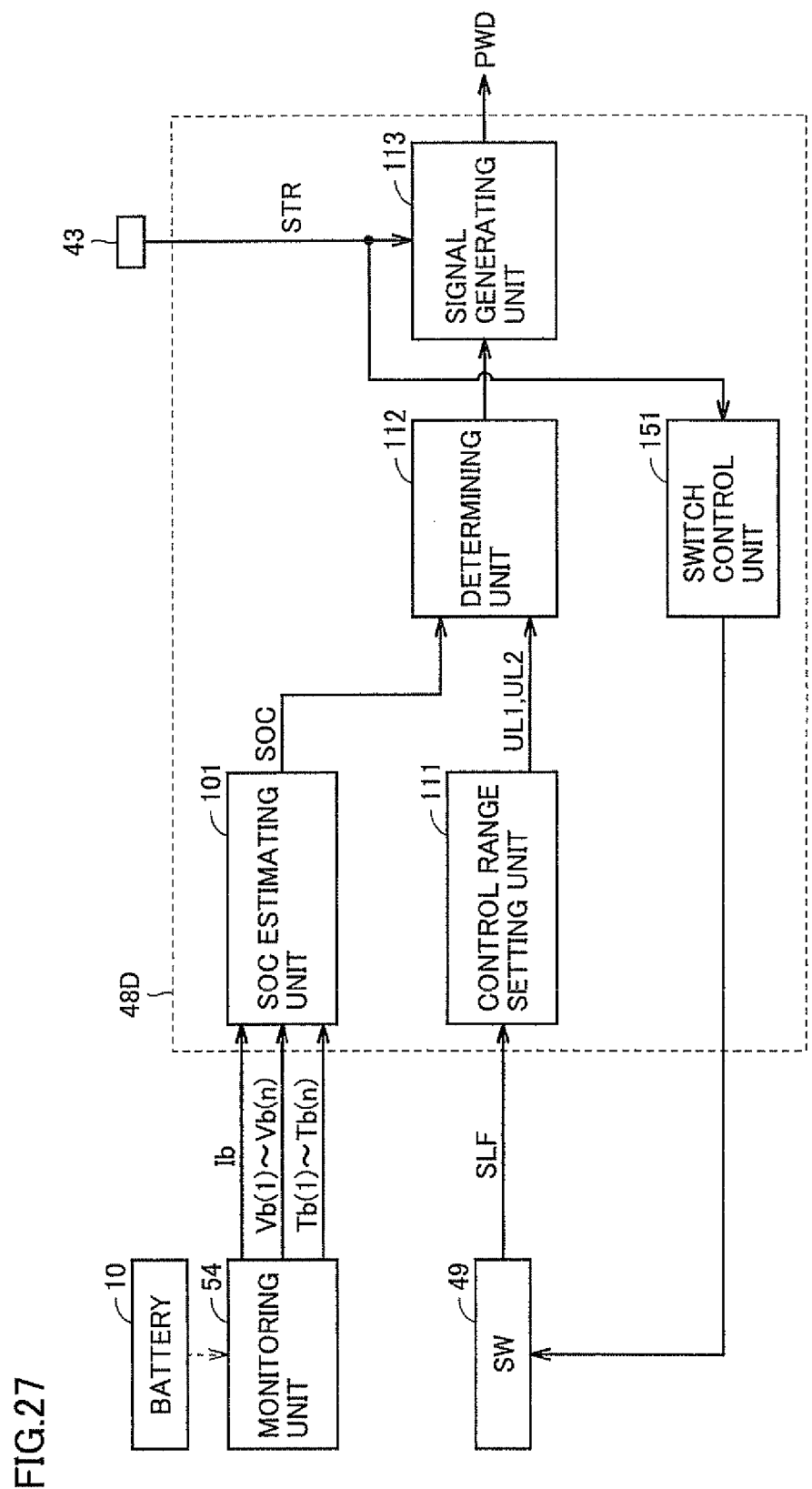
FIG. 27 is a functional block diagram of the charge ECU shown in FIG. 26.

FIG. 27 is a functional block diagram of the charge ECU shown in FIG. 26. Referring to FIGS. 27 and 3, charge ECU 48D is different from charge ECU 48 in that it additionally includes a switch control unit 151. Switch control unit 151 receives the signal STR from sensor 43. While switch control unit 151 is receiving the signal STR, switch control unit 151 does not execute control of switch 49. When connector 62 is removed from charge inlet 42, sensor 43 stops output of signal STR. When sensor 43 stops output of signal STR, switch control unit 151 sets switch 49 on.

Figure 28:
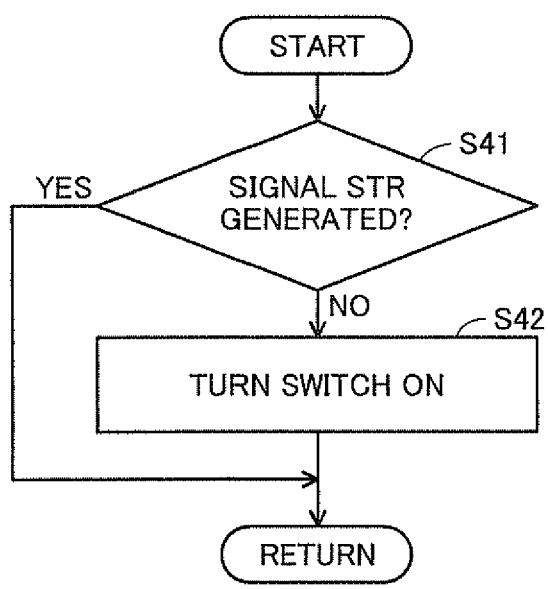
FIG. 28 is a flowchart representing control of a switch executed by the charge ECU shown in FIG. 26.

FIG. 28 is a flowchart representing control of a switch executed by the charge ECU shown in FIG. 26. Referring to FIG. 28, charge ECU 48D determines whether or not the signal STR is generated, at step S41. If charge ECU 48D receives the signal STR, charge ECU 48D determines that the signal STR is generated. In this case (YES at step S41), the process returns to the main routine. Therefore, the state of switch 49 is unchanged. On the other hand, if it is determined that the signal STR is not generated (NO at step S41), at step S42, charge ECU 48D turns on switch 49. When the process of step S42 ends, the overall process returns to the main routine.

It is noted that charge ECU 48D executes the process shown in the flowchart of FIG. 5 for charging battery 10.

The following example may be considered. Usually, the charging mode is set to the long life mode. If long distance travel by the vehicle 1D becomes necessary, the user turns off switch 49. Thus, the charging mode is switched from the long life mode to the normal mode. It is possible, however, that the user forgets to turn on switch 49, since there is not much chance that the user operates switch 49.

Since charge ECU 48D turns on switch 49, the charging mode can be returned from the normal mode to the long life mode. Thus, it follows that battery 10 is again charged in the long life mode and, hence, deterioration of battery 10 can be reduced.

[Other Examples of Vehicle Configuration]

In Embodiments 1 to 5, vehicles including only a motor as the driving source for generating the driving force have been described. The present invention, however, is applicable to a vehicle including a power storage device and an electric motor generating driving force from the electric power stored in the storage device. Therefore, the present invention is applicable, for example, to a hybrid vehicle including an engine and an electric motor as driving sources.

Figure 29:
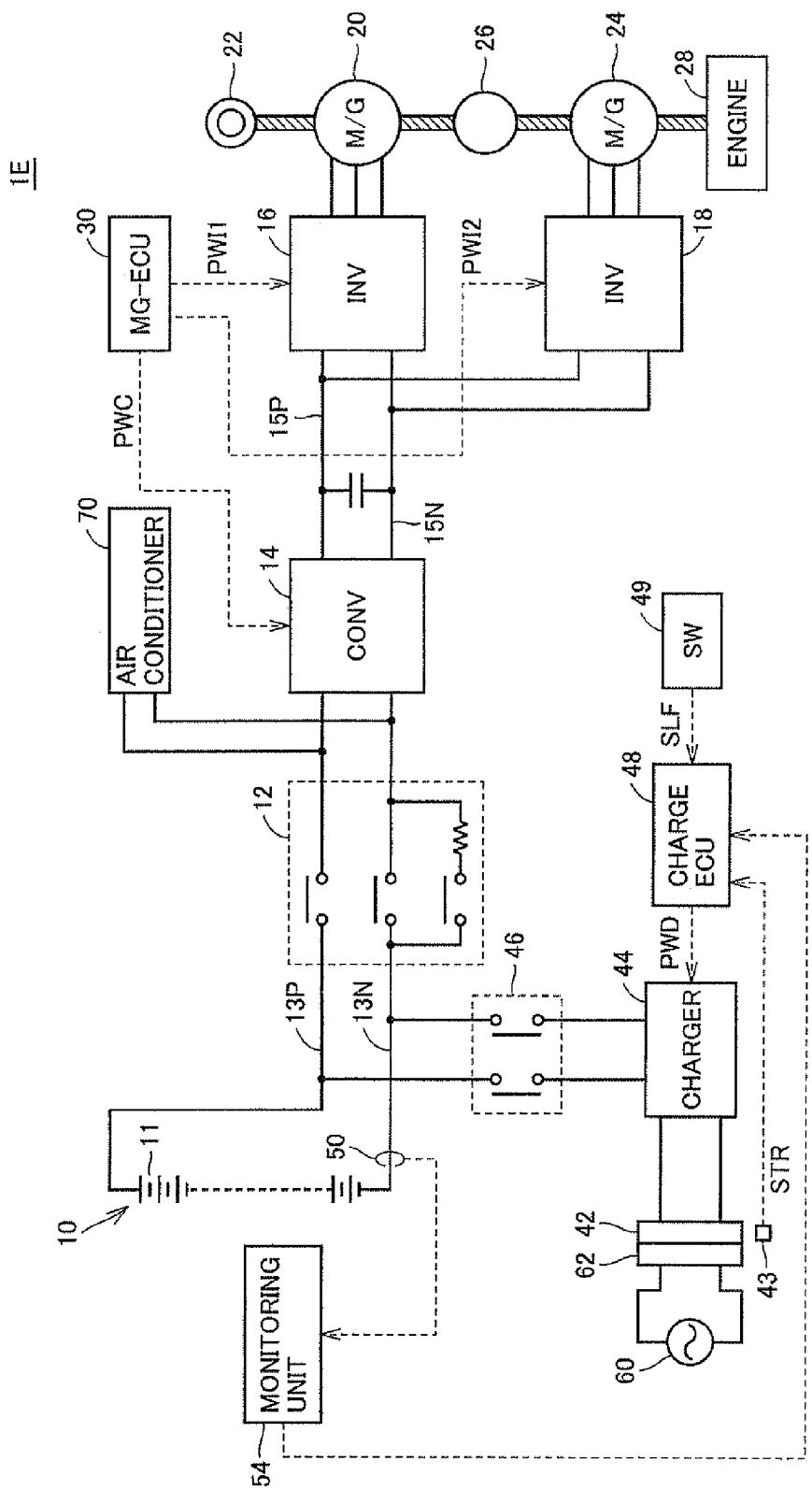
FIG. 29 shows a configuration of a hybrid vehicle as an example of the vehicle in accordance with the present invention.

FIG. 29 shows a configuration of a hybrid vehicle as an example of the vehicle in accordance with the present invention. Referring to FIGS. 29 and 1, a vehicle 1E is different from vehicle 1 in that it additionally includes a converter (CONV) 14, an inverter 18, an MG 24, a power split device 26, and an engine 28.

Engine 28 generates power by burning fuel such as gasoline. Converter 14 converts DC voltage across positive electrode line 13P and negative electrode line 13N and DC voltage across positive electrode line 15P and negative electrode line 15N to/from each other, based on the control signal PWC received from MG-ECU 30.

Inverter 18 has a structure similar to that of inverter 16 and realized, for example, by a three-phase bridge circuit. MG 24 is an AC rotating electrical machine, and it is implemented, for example, by a three-phase AC synchronous electric motor having a rotor with a permanent magnet embedded. Inverter 18 drives MG 24 based on a control signal PWI2 received from MG-ECU 30.

Driving shaft of MG 24 is coupled to power split device 26. Power split device 26 includes a planetary gear mechanism including a sun gear, a pinion gear, a planetary carrier and a ring gear. The rotation shaft of MG 24, a crank shaft of engine 28 and a driving shaft coupled to driving wheels 22 are connected to power split device 26. Power split device 26 distributes the power output from engine 28 to MG 24 and driving wheels 22. Thus, engine 28 can drive vehicle 1E.

In the configuration shown in FIG. 29, battery 10 can be charged by power source 60 provided outside of vehicle 1E. Further, by the driving force of MG 20, vehicle 1E can travel with engine 28 stopped. Therefore, the present invention is applicable to vehicle 1E having the configuration shown in FIG. 29. It is noted that vehicle 1E may include any of charge ECUs 48A to 48D in place of charge ECU 48.

FIG. 29 shows a series/parallel type hybrid vehicle in which the power from engine 28 can be transmitted to driving wheels 22 and MG20 by power split device 26. The present invention is also applicable to hybrid vehicles of different types. By way of example, the present invention is applicable to a so-called series type hybrid vehicle in which only engine 28 is used for driving MG24 and vehicle driving force is generated only by MG20.

Further, the present invention is also applicable to a fuel cell vehicle including a fuel cell as a DC power source in addition to battery 10.

In the embodiments of the present invention, lithium ion battery is used as the power storage device for supplying electric power to the electric motor. The application of the present invention, however, is not limited to a vehicle using lithium ion battery. As long as a vehicle has a power storage device that may possibly be deteriorated when kept at the high SOC state and the vehicle has an electric motor of which driving force is generated by the power storage device, the present invention is applicable to such a vehicle.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

REFERENCE SIGNS LIST 1, 1A-1E vehicles, 10 battery, 11 cell, 12 system main relay, 13N, 15N negative electrode lines, 13P, 15P positive electrode lines, 14 converter, 16, 18 inverters, 20 motor generator, 22 driving wheels, 26 power split device, 28 engine, 42 charge inlet, 43 sensor, 44 charger, 46 relay, 48, 48A-48D charge ECUs, 49, 49A switches, 50 current sensor, 54 monitoring unit, 56(1)-56(n) sensors, 58 analog-digital converter, 60 power source, 62 connector, 70 air conditioner, 72 display device, 80 navigation system, 101 SOC estimating unit 111, 111A, 111B control range setting units, 112 determining unit, 113 signal generating unit, 121 current accumulating unit, 122 capacity estimating unit, 123 deterioration state estimating unit, 124 storage unit, 125 cruising distance calculating unit, 131 history storage unit, 141 use range estimating unit, 142 notifying unit, 151 switch control unit, BB(1)-BB(n) battery blocks.

The invention claimed is:

1. A vehicle, comprising:
a power storage device configured to be rechargeable;
an electric motor configured to generate driving force for driving said vehicle by using electric power stored in said storage device;
a command generating unit configured to switch between generation of a command to extend a useable period of said power storage device and stopping of generation of said command, by a manual operation; and
a controller for controlling state of charge of said power storage device,
said controller including
a state estimating unit configured to calculate an index value indicating said state of charge, and
a setting unit configured to set a control range of said index value; wherein
said setting unit sets said control range to a first range while said command generating unit stops generation of said command, and sets said control range to a second range narrower than said first range, when said command is generated by said command generating unit;
said controller further includes
a distance calculating unit configured to estimate a possible distance of travel by said vehicle based on said control range and degree of deterioration of said power storage device;
said possible distance of travel includes
a first possible distance of travel, and
a second possible distance of travel;
said first possible distance of travel represents a distance said vehicle can travel if a range of variation of said index value during traveling of said vehicle is within said first range; and
said second possible distance of travel represents a distance said vehicle can travel if said range of variation of said index value during traveling of said vehicle is within said second range;
said vehicle further comprising;
a display device configured to be able to display said first and second possible distances of travel calculated by said distance calculating unit.

2. The vehicle according to claim 1, further comprising a charging mechanism configured to supply electric power output from a power source outside said vehicle to said power storage device; wherein
said control range is a range of said index value at a time of charging of said power storage device;
said first range has a first upper limit value;
said second range has a second upper limit value; and
said setting unit is configured to set said second upper limit value such that said second upper limit value becomes smaller than said first upper limit value.

3. The vehicle according to claim 1, wherein
said first and second possible distances of travel represent distances said vehicle can travel at present;
said controller further includes
a deterioration state estimating unit configured to estimate present degree of deterioration of said power storage device as said degree of deterioration; and
said distance calculating unit is configured to estimate said first and second possible distances of travel based on said degree of deterioration estimated by said deterioration state estimating unit.

4. The vehicle according to claim 1, wherein
said first and second possible distances of travel represent distances said vehicle can travel after a prescribed time period from present time;
said controller further includes
a deterioration state estimating unit configured to estimate degree of deterioration of said power storage device after the prescribed time period from present time; and
said distance calculating unit is configured to estimate said first and second possible distances of travel based on said degree of deterioration estimated by said deterioration state estimating unit.

5. The vehicle according to claim 2, wherein
said controller further includes
a storage unit configured to store history of range of variation of said index value while said vehicle is traveling; and
said setting unit is configured to change said second upper limit value based on said history.

6. The vehicle according to claim 2, further comprising
a navigation device for setting a route of travel of said vehicle; wherein
said setting unit is configured to set said second upper limit value such that said vehicle can travel entire said route of travel set by said navigation device.

7. The vehicle according to claim 6, wherein
said controller further includes
a notifying unit configured to notify the user that, when said second upper limit value set by said setting unit exceeds a standard value, said manual operation of said command generating unit for stopping generation of said command is necessary.

8. A method of controlling a vehicle, wherein
said vehicle includes
a power storage device configured to be rechargeable,
an electric motor configured to generate driving force for driving said vehicle by using electric power stored in said storage device,
a command generating unit configured to switch between generation of a command to extend a useable period of said power storage device and stopping of generation of said command, by a manual operation,
a controller for controlling state of charge of said power storage device, and
a display device;
said method comprising the steps of:
calculating an index value indicating said state of charge; and
setting a control range of said index value; wherein
at said step of setting, said control range is set to a first range if said command generating unit stops generation of said command, and said control range is set to a second range narrower than said first range if said command is generated by said command generating unit;
said control method further comprising the step of
estimating a possible distance of travel by said vehicle based on said control range and degree of deterioration of said power storage device; wherein
said possible distance of travel includes
a first possible distance of travel, and
a second possible distance of travel;
said first possible distance of travel represents a distance said vehicle can travel if a range of variation of said index value during traveling of said vehicle is within said first range; and
said second possible distance of travel represents a distance said vehicle can travel if said range of variation of said index value during traveling of said vehicle is within said second range;
said control method further comprising the step of
outputting said first and second possible distances of travel to said display device so that said first and second possible distances of travel can be displayed on said display device.

9. The vehicle control method according to claim 8, wherein
said vehicle further includes a charging mechanism configured to supply electric power output from a power source outside said vehicle to said power storage device;
said control range is a range of said index value at a time of charging of said power storage device;
said first range has a first upper limit value;
said second range has a second upper limit value; and
at said setting step, said second upper limit value is set such that said second upper limit value becomes smaller than said first upper limit value.

10. The vehicle control method according to claim 8, wherein
said first and second possible distances of travel represent distances said vehicle can travel at present; and
said step of estimating said possible distance of travel includes the steps of
estimating present degree of deterioration of said power storage, and
estimating said first and second possible distances of travel by using said degree of deterioration.

11. The vehicle control method according to claim 8, wherein
said first and second possible distances of travel represent distances said vehicle can travel after a prescribed time period from present time; and
said step of estimating said possible distance of travel includes the steps of
estimating said degree of deterioration after said prescribed time period from the present time, and
estimating said first and second possible distances of travel using said degree of deterioration.

12. The vehicle control method according to claim 9, wherein
said setting step includes the steps of
learning history of range of variation of said index value while said vehicle is traveling, and
changing said second upper limit value based on said history.

13. The vehicle control method according to claim 9, wherein
said vehicle further includes a navigation device for setting a route of travel of said vehicle; and
at said step of setting, said second upper limit value is set such that said vehicle can travel entire said route of travel set by said navigation device.

14. The vehicle control method according to claim 13, further comprising the step of
notifying a user that, when said second upper limit value set at said setting step exceeds a standard value, said manual operation of said command generating unit for stopping generation of said command is necessary.

* * * * *